(12) United States Patent
Romer-Nochebuena et al.

(10) Patent No.: US 8,828,137 B2
(45) Date of Patent: Sep. 9, 2014

(54) ADDITIVE COMPOSITION FOR MORTARS, CEMENTS AND JOINT COMPOUNDS AND CEMENTITIOUS COMPOSITIONS MADE THEREFROM

(71) Applicant: Celanese International Corporation, Dallas, TX (US)

(72) Inventors: Eduardo Romer-Nochebuena, Pearland, TX (US); Jose A. Briones, Flower Mound, TX (US); Mark G. Cupta, Roswell, GA (US); Philip J. Brondsema, Houston, TX (US)

(73) Assignee: Celanese International Corporation, Dallas, TX (US)

( * ) Notice: Subject to any disclaimer, the term of this patent is extended or adjusted under 35 U.S.C. 154(b) by 39 days.

(21) Appl. No.: 13/661,333

(22) Filed: Oct. 26, 2012

(65) Prior Publication Data

US 2013/0053475 A1 Feb. 28, 2013

Related U.S. Application Data

(62) Division of application No. 12/313,977, filed on Nov. 26, 2008, now Pat. No. 8,323,400.

(60) Provisional application No. 60/991,492, filed on Nov. 30, 2007.

(51) Int. Cl.

| C04B 7/02 | (2006.01) |
|---|---|
| C04B 7/00 | (2006.01) |
| C04B 9/12 | (2006.01) |
| C04B 28/00 | (2006.01) |
| C04B 28/06 | (2006.01) |
| C04B 28/14 | (2006.01) |

(52) U.S. Cl.
USPC ........ 106/713; 524/4; 524/5; 524/6; 524/650; 525/157

(58) Field of Classification Search
USPC ............ 162/164.3; 106/713; 524/4, 5, 6, 650; 525/157
See application file for complete search history.

(56) References Cited

U.S. PATENT DOCUMENTS

| 4,654,085 A | 3/1987 | Schinski |
| 4,710,526 A | 12/1987 | Tokumoto et al. |
| 5,281,307 A * | 1/1994 | Smigo et al. ............... 162/164.3 |
| 7,294,194 B2 | 11/2007 | Reddy et al. |
| 2001/0018881 A1 | 9/2001 | Futami et al. |
| 2004/0198873 A1 | 10/2004 | Bury et al. |

FOREIGN PATENT DOCUMENTS

| DE | 287251 A5 | 2/1991 |
| DE | 102010033844 | 2/2012 |
| EP | 0201355 A2 | 11/1986 |
| EP | 0219871 A2 | 4/1987 |
| EP | 0220073 A2 | 4/1987 |
| EP | 0649823 A1 | 4/1995 |
| EP | 0873978 A1 | 10/1998 |
| EP | 1158007 A1 | 11/2001 |
| GB | 1225755 | 3/1971 |
| GB | 1490783 | 11/1977 |
| WO | 97-01523 | 1/1997 |
| WO | 2007-034073 A2 | 3/2007 |

\* cited by examiner

Primary Examiner — James J. Seidleck
Assistant Examiner — Deve E Valdez
(74) Attorney, Agent, or Firm — Michael W. Ferrell; Ferrells, PLLC; Anna L. Kinney

(57) ABSTRACT

An additive composition for mortars, exterior insulation finish systems, self-leveling compounds and joint compounds is disclosed. The additive composition contains a nitrogen-containing polymer and a reactive agent capable of forming a crosslinking reaction with the nitrogen-containing polymer. Small amounts of the additive composition contained in a product not only can increase one or more properties of the product but can also minimize the use of redispersible polymers in the product.

50 Claims, 1 Drawing Sheet

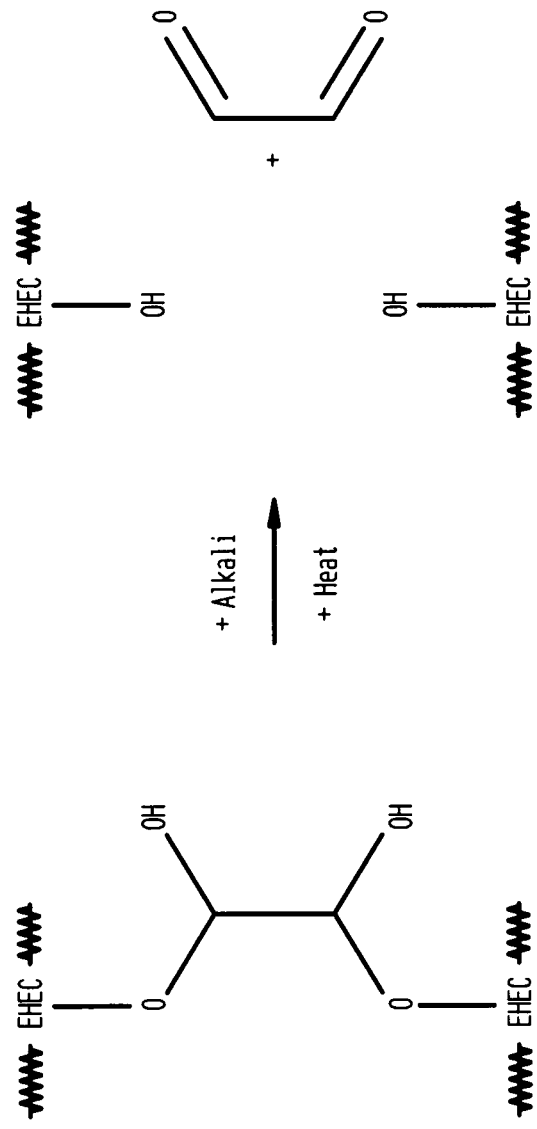

ADDITIVE COMPOSITION FOR MORTARS, CEMENTS AND JOINT COMPOUNDS AND CEMENTITIOUS COMPOSITIONS MADE THEREFROM

CLAIM FOR PRIORITY

This application is a Divisional Application of U.S. patent application Ser. No. 12/313,977, entitled "Additive Composition for Mortars, Cements and Joint Compounds and Cementitious Compositions Made Therefrom", filed Nov. 26, 2008, now U.S. Pat. No. 8,323,400. U.S. patent application Ser. No. 12/313,977 is based upon U.S. Provisional Patent Application Ser. No. 60/991,492, filed Nov. 30, 2007, of the same title. The priorities of U.S. patent application Ser. No. 12/313,977 and of U.S. Provisional Patent Application Ser. No. 60/991,492 are hereby claimed and the disclosure of both applications is incorporated herein by reference in their entireties.

BACKGROUND

Cementitious materials can include various different types of cements, compounds, mortars, joint compounds, construction adhesives, and the like. These products typically contain a binder and a filler. The binder may comprise, for instance, a cement such as Portland cement or gypsum. The filler, on the other hand, may comprise a quartz sand or calcium carbonate.

In addition to a binder and a filler, the compositions can also contain various other additives. For instance, cellulose derivatives and other materials have been added to the cementitious compositions. The cellulose derivatives are added in order to improve the workability of the composition, to increase the water-retention properties of the composition, and to increase the adhesiveness and the resistance to sliding. Increasing water retention, for instance, can prevent the composition from losing water prior to setting on highly absorbent substrates and allows for control of the open time and adjusting time. If the composition sets too quickly, the resulting composite may not develop the mechanical adhesion strength required to keep a tile adhesive attached on the adjacent surface as well as to prevent cracks, for example. Workability is also improved due to the lubricant properties of the cellulose ethers. Cellulose derivatives may be used with or without a polyvinyl alcohol resin in cementitious tile adhesive compositions; see Great Britain 1,490,783 of Griffith et al. and Great Britain 1,225,755 of Vaughn et al., the disclosures of which are incorporated herein by reference. Latex and other resinous additives for cementitious compositions are also seen in the following references: European Patent Application Publication 0 649 823 which discloses the use of polyvinyl alcohol and polyvinyl acetate; U.S. Pat. No. 7,294,194 to Reddy et al. which discloses various latexes for preserving elasticity; and United States Patent Application Publication No. 2001/0018881 of Futami et al. which advocates the use of melamine and sulfonic acid/formaldehyde condensates, naphthalene sulfonic acid condensates and amide resins in cement.

Synthetic polymer additives for mortars are frequently supplied as redispersible powders or emulsions. The redispersible polymer may comprise, for instance, an emulsion made out of polyvinyl acetate homopolymer and copolymers stabilized with polyvinyl alcohol. The redispersible polymer may improve workability, sag resistance, flexibility and tension strength under standard conditions, but also after water immersion, heat aging and freeze-thaw cycles and so forth. Exemplary redispersible powders are described in European Patent Application Publication No. 1 158 007 of Hara et al. and European Patent Application Publication No. 0 873 978 of Hornamen et al., both of which relate to polyvinyl alcohol (PVOH) stabilized latexes. The disclosures of EP 1 158 007 and EP 0 873 978 are incorporated herein by reference.

Although the incorporation of cellulose derivatives, redispersible polymers and other additives has provided many advances in the art, some deficiencies still remain. For example, cellulose ethers when present in the composition can cause a considerable delay in cement setting. Redispersible polymers, on the other hand, can be relatively expensive, thus adding cost to the final product.

In view of the above, a need currently exists for additives that can further improve the properties of a cementitious composition. In particular, a need exists for additives that can be used to control the wet properties and the mechanical properties of a cementitious composition containing the additives. A need also exists for additives that can reduce or eliminate the amount of redispersible polymers in a cementitious composition without adversely affecting the properties of the composition. This need is based on both the high cost of redispersible powders, and the fact that high levels of redispersible powders can cause an imbalance in a cementitious composition. For example, redispersible powders can help impart flexibility; however they typically can hinder properties like water resistance.

SUMMARY OF INVENTION

In general, the present invention is directed to an additive composition for cementitious compositions and to cementitious compositions made therefrom. Cementitious compositions may include, for instance, a mortar, a cement, a joint compound, exterior insulation finishing systems, self leveling systems and the like. Specific applications include: tile adhesives (bathroom & kitchen floor, countertop and wall); exterior insulation finishing systems (EIFS) (adhesive system for exterior wall insulation); self-leveling compounds (mortars that are poured onto a floor for leveling and tile or carpet sub-surface); coatings; concrete repair; façade coatings; grouts; gypsum applications; joint fillers; mineral plasters; patch and repair mortars; rendering plaster; powder paints; sealing slurries; thin bed mortars; and troweling compounds. In one embodiment, the cementitious composition can be packaged in a dry form. In this embodiment, water can be added prior to use.

In one embodiment, the additive composition of the present invention comprises a nitrogen-containing polymer and a reactive agent capable of forming a cross-linking reaction with the nitrogen-containing polymer. The additive composition may, optionally, contain one or more additional ingredients such as, for instance a cellulose derivative and a polyvinyl alcohol polymer. According to one embodiment, the nitrogen-containing polymer may be a copolymer of a vinyl alcohol and a vinyl amine. The reactive agent, in addition to being capable of forming a crosslinking reaction with the nitrogen-containing polymer, can for instance, also be capable of forming a crosslinking reaction with the cellulose derivative, and/or the polyvinyl alcohol. In another embodiment, for instance, the reactive agent may comprise a glyoxal, borax, or maleic anhydride copolymer, materials that are believed to form a crosslinking reaction with the nitrogen-containing polymer and, optionally, with the cellulose derivative and/or the polyvinyl alcohol. Other crosslinking agents that may be used include glutaraldehyde, succinic dialdehyde, blocked glyoxal (12% glyoxal, 33% dipropylene glycol, and water), cationic amine polymer-epichlorohydrin, polyamide epichlorohydrin, potassium zirconium carbonate, ammonium zirconium carbonate, ketone formaldehyde, styrene maleic anhydride copolymer, cyclic amide condensate, and the like.

The nitrogen-containing polymer is further described as a polymer containing primary or secondary nitrogen functional groups, such as amines, imines, amides, and the like. For instance, in various embodiments, the nitrogen-containing polymer comprises polyvinylalcohol-co-vinylamine, polyvinylalcohol-co-vinylformamide, polyvinylamine, polyvinylformamide, polyethyleneamine, polyethyleneimine, polyacrylamide, or mixtures thereof. Suitable nitrogenous polymers may thus include any one or a combination of the following nitrogen functionalities: primary amino ($-NH_2$) groups; mono-substituted (secondary) amino groups —NHR where R is hydrocarbyl, generally either alkyl or aryl, e.g., lower alkyl or phenyl, for example, methylamino, ethylamino, isopropylamino, butylamino, cyclopropylamino, cyclohexylamino, n-hexylamino, phenylamino, benzylamino, chloroethylamino, hydroxyethylamino, etc.); amides —(CO)—$NR^1R^2$ where $R^1$ and $R^2$ may be the same or different and are either hydrogen or R, wherein R is as defined above (including, for example, amides wherein one of $R^1$ or $R^2$ is H and the other is methyl, butyl, benzyl, etc.); imines and so forth. Typical nitrogen-containing polymers may be prepared using one or more of the following classes of monomers: vinylamines; vinylformamides; ethyleneamines; ethyleneimines; acrylamides; methacrylamides; acrylates and methacrylates substituted with a primary or secondary amino group optionally bound through a lower alkylene linker (e.g., aminoethyl methacrylate); caprolactams and so forth. The foregoing list is intended to be illustrative and not limiting with regard to possible nitrogen-containing monomers that can be used in the preparation of suitable nitrogen-containing polymers for use with the inventive additive compositions.

The derivatized cellulose that may be contained within the additive composition can be any suitable cellulose ether. For instance, in one embodiment, the derivatized cellulose comprises methyl cellulose, hydroxypropyl methyl cellulose, hydroxyethyl methyl cellulose, carboxymethyl cellulose, hydroxyethyl cellulose, ethyl hydroxyethyl cellulose, hydroxypropyl cellulose, ethyl cellulose, or mixtures thereof.

As mentioned, the nitrogen-containing polymer may, according to an embodiment be a vinyl alcohol and vinyl amine copolymer which, if present can contain from about 2 to about 30 mole percent vinyl amine functionality. For instance, the vinyl alcohol and vinyl amine copolymer may contain from about 2 mole percent to about 12 mole percent vinyl amine. The weight ratio of nitrogen-containing polymer presenting the cementitious composition can vary depending upon the particular application and the desired result. In one embodiment, for instance, the percent addition of the nitrogen-containing polymer in the cementitious composition can be from about 0.01% to about 5%, or more preferably 0.1% to 2%.

In one embodiment, the reactive agent, such as a glyoxal, can be pre-reacted with a cellulose derivative, polyvinyl alcohol, or an inorganic compound such as clays, calcium carbonates, calcium oxides, and the like. This effectively creates a carrier system for the reactive agent that would allow for easy incorporation of both wet and dry reactive agents with the nitrogen-containing polymer and the other components of the cementitious composition, if present. The weight ratio of the reactive agent to the carrier, if present, can be from about 0.001:1 to about 0.5:1, or more preferably 0.01:1 to about 0.1:1.

In another preferred aspect of the invention, the reactive agent is pre-reacted with a carrier such as cellulose in a reversible reaction. These components can be prepared or purchased, e.g., FQ grades of BERMOCOLL™ resins available from Akzo Nobel as is discussed hereinafter.

The additive composition can be incorporated into numerous construction adhesives. In one embodiment, for instance, the additive composition can be contained in a dry cementitious composition. The cementitious composition in addition to the additive composition can contain a binder and a filler. The binder, for instance, may comprise cement, gypsum, or mixtures thereof. The filler, on the other hand, may comprise calcium carbonate particles, quartz sand, or mixtures thereof.

In one particular embodiment, the cementitious composition contains the binder in an amount from about 20 parts to about 60 parts by weight and the filler in an amount from about 40 parts to about 80 parts by weight. The nitrogen-containing polymer can be present in the composition in an amount from about 0.01 parts to about 5 parts by weight, preferably from about 0.01 parts to about 2 parts by weight. According to those embodiments where a cellulose derivative is present, it may be present in the cementitious composition in an amount from about 0.01 parts to about 3 parts by weight, preferably from about 0.1 to about 1 part by weight.

In one particular embodiment, the cementitious composition can further contain a redispersible polymer powder. The redispersible polymer powder may comprise, for instance, polyvinyl acetate homopolymer and copolymers, with or without an olefin such as ethylene, that are dispersible in water. The powder may be stabilized with the nitrogen-containing polymer alone or in combination with polyvinyl alcohol polymer. The redispersible polymer powder can be present in the composition in an amount from 0 to about 16 parts by weight. In one embodiment, for instance, the redispersible polymer powder is present in an amount less than about 2 parts by weight.

In addition to a redispersible polymer, various other additives and ingredients can be contained in the cementitious composition. For instance, in one embodiment, the cementitious composition optionally may contain additives, such as lubricants, hydrophobic agents, fillers, pigments, setting accelerators, retardants or mixtures thereof. For example, suitable modifiers may include sodium stearate silicones, siloxanes and so forth.

In an alternative embodiment, the nitrogen-containing polymer may be incorporated into a redispersible polymer powder that is then added to the cementitious composition optionally in conjunction with the derivatized cellulose and crosslinking agent. In this embodiment, for instance, the redispersible polymer may comprise a powder as described above. The powder, for instance, may include a copolymer of vinyl acetate and a comonomer. The comonomer, for instance, may comprise an olefin, a vinyl ester of a carboxylic acid, vinyl chloride, styrene, or mixtures thereof. Suitable olefins that may be used include, for instance, ethylene or propylene. Vinyl esters of carboxylic acids, on the other hand, may comprise vinyl esters of alpha-branched monocarboxylic acids such as a vinyl ester of versatic acid. Versatic acid is a branched carboxylic acid having ten carbon atoms. The above copolymer if present can be combined with the nitrogen-containing polymer.

In one embodiment, for instance, the redispersible polymer powder containing the polyvinyl alcohol polymer may contain a vinyl acetate and a comonomer in a weight ratio of from about 60:40 to about 90:10, such as at a weight ratio of about 80:20. The polyvinyl alcohol polymer, optionally in conjunction with the nitrogen-containing polymer, may be combined with the above copolymer in order to stabilize the powder when formed into an emulsion. The redispersible polymer powder may contain, in one embodiment, the polyvinyl alcohol polymer particles and/or the nitrogen-containing polymer particles in an amount from about 4% to about 18% by weight, such as in an amount of about 8% to about 12% by weight, based upon the total weight of the monomers present used to form the copolymer. In addition to the vinyl acetate copolymer, the polyvinyl alcohol polymer and the nitrogen-containing polymer, the redispersible polymer may further include a defoamer, an initiator, one or more surfactants, a buffer, and any other suitable additives.

In one embodiment, for instance, the redispersible polymer powder may be incorporated into the cementitious composition in an amount from about 0.5 parts to about 16 parts by weight, such as from about 1 part to about 6 parts by weight.

Other features and aspects of the present disclosure are discussed in greater detail below.

BRIEF DESCRIPTION OF THE DRAWINGS

The invention is described in detail below with reference to the appended drawings, wherein like numerals designate similar parts. In the Figures:

FIG. 1 is a schematic illustrating the hydrolysis of a pre-reacted reactive agent.

DETAILED DESCRIPTION

The invention is described in detail below with reference to numerous embodiments and examples. Such discussion is for purposes of illustration only. Modifications to particular examples within the spirit and scope of the present invention, set forth in the appended claims, will be readily apparent to one of skill in the art.

Terminology used herein is given its ordinary meaning consistent with the usage of such terms in the chemical and polymer arts. Unless otherwise specified, the version of a test method applied is that in effect as of Jan. 1, 2008. %, percent, and so forth refers to percent by weight on a dry basis unless the usage or context clearly indicates otherwise. "Dry" means substantially dry, but not excluding that amount of residual moisture which is bound to or sorbed by the material at equilibrium with its ordinary surroundings.

When we refer to a molar equivalent ratio of the reactive moieties of the reactive agent to nitrogen in a nitrogen-containing polymer, we are referring to the use of a pair of reactive moieties capable of crosslinking. For example, 1 mol of glyoxal per mol of nitrogen is a 1:1 ratio. Likewise, for example, a 1:1 molar equivalent ratio refers to 1 mole of maleic anhydride units in a styrene maleic anhydride copolymer to 1 mole of nitrogen in the nitrogen-containing polymer in the composition. Zirconium is in a 1:1 molar equivalent ratio with the nitrogen in the nitrogen-containing polymer as a reactive agent when present in equimolar amounts and so forth.

"PPHC" refers to parts per hundred weight of inorganic binder and filler in a cementitious composition on a dry basis. For example, in a composition containing 60 parts sand, 40 parts Portland Cement and 10 parts polymer additive and water, the composition has 60 PPHC sand, 40 PPHC binder and 10 PPHC polymer irrespective of the amount of water added.

In general, the present disclosure is directed to an additive composition that is well suited for use in cementitious compositions. For example, the additive composition can be included in various products including a mortar, a cement, a joint compound, and the like. Cementitious compositions made in accordance with the present disclosure generally contain a binder and a filler. The binder may comprise, for instance, a cement, such as Portland cement, and/or gypsum. These products can be packaged in dry form. When packaged in dry form, the cementitious composition may then be combined with water and mixed to form a slurry or paste. The wetted material is then applied to a desired area where it hardens over time. The additive composition of the present disclosure can be added to the cementitious composition to provide one or more benefits and advantages.

The additive composition, for instance, has been found, in some applications, to improve one or more properties of the cementitious composition. The additive composition has also been found, in certain embodiments, to improve the properties of the resulting cement or mortar product, such as slip and water resistance in tile adhesive. As will be described in greater detail below, use of the additive composition in a cementitious composition can, in one particular embodiment, also minimize the amount of redispersible polymers contained in the composition without adversely impacting upon the properties of the resulting product.

In general, the additive composition of the present disclosure comprises: a nitrogen-containing polymer and a reactive agent capable of forming a cross-linking reaction with the nitrogen-containing polymer. In one embodiment the nitrogen-containing polymer may be a vinyl alcohol and vinyl amine copolymer. A reactive agent is selected that forms a crosslinking reaction with at least the nitrogen-containing polymer. In one particular embodiment, for instance, the reactive agent may be configured to form a crosslinking reaction with two or more of the other optional components contained in the additive composition. The nitrogen-containing polymer can be incorporated into a cementitious composition in accordance with the present disclosure either directly or, alternatively, may be used to form a redispersible polymer that is then added to the cementitious composition.

Cellulose derivatives that may optionally be included in the additive composition of the present disclosure include any suitable cellulose ether. Cellulose ethers have been added to construction materials in the past in order to increase the water retention capacity of the product, to increase the stability of the product under load, to improve the working properties of the product prior to hardening, and/or to improve the mechanical adhesion properties of the product.

Cellulose ethers that may be used according to the present disclosure include methyl cellulose, hydroxyethyl cellulose, hydroxypropyl cellulose, carboxymethyl cellulose, ethyl hydroxyethyl cellulose, hydroxypropyl cellulose, ethyl cellulose, hydroxypropyl methyl cellulose, hydroxyethyl methyl cellulose and mixtures thereof. In one particular embodiment, for instance, the cellulose ethers present within the additive composition include hydroxyethyl methyl cellulose, hydroxypropyl methyl cellulose, or mixtures thereof.

As described above, the nitrogen-containing polymer provided in the additive composition may be a vinyl alcohol and vinyl amine copolymer. Processes for producing vinyl alcohol and vinyl amine copolymers are disclosed, for instance, in U.S. Pat. No. 5,300,566, which is incorporated herein by reference. Vinyl alcohol and vinyl amine copolymers, for instance, can be formed by copolymerizing vinyl acetate and an N-vinyl formamide to yield a poly(vinyl acetate)-co-poly (N-vinyl formamide) which is thereafter hydrolyzed to form the copolymer. The vinyl alcohol and vinyl amine copolymer can be described as having the following structure:

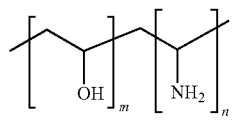

wherein m is from about 0.80 to about 0.98 and n is from about 0.02 to about 0.30.

As shown above, the vinyl alcohol and vinyl amine copolymer generally contains from about 1 mole percent to about 30 mole percent vinyl amine functionality. For example, the vinyl alcohol and vinyl amine copolymer can contain vinyl amine in an amount from about 2 mole percent to about 30 mole percent, such as from about 2 mole percent to about 12 mole percent. Vinyl alcohol and vinyl amine copolymers particularly well suited for use in the present disclosure can be obtained commercially from the Celanese Corporation of Dallas, Tex. Such copolymers are commercially sold, for instance, under the trade name CELVOL.

The various polymeric ingredients are of suitable molecular weight. Generally, polyvinyl alcohols, polyvinyl amines, and so forth useful in connection with the invention have molecular weights (number average) in the range of from 5,000-200,000 or so. For example, a suitable vinyl amine nitrogen-containing polymer may have a number average molecular weight of from 35,000-40,000 Daltons/mol corresponding to a weight average molecular weight of 55,000-75,000 Daltons/mol or so. Cellulose derivatives typically have higher molecular weights; generally having molecular weights (number average) in excess of 100,000 Daltons/mol as is known in the art.

The addition of a nitrogen-containing polymer, which according to one embodiment may be a vinyl alcohol and vinyl amine copolymer, into a cementitious composition can provide various advantages and benefits. For example, vinyl alcohol and vinyl amine containing copolymers have enhanced cold water solubility, can improve the open time, adjustability, tensile and shear adhesion strength and compressive strength, of a resulting composition, and can be used to better control setting times for the cement or mortar product, especially when combined with a reactive agent that is capable of forming a crosslinking reaction with the nitrogen-containing polymer and other optional ingredients such as a cellulose derivative.

The reactive agent present within the additive composition can be any suitable reactive agent capable of crosslinking with the nitrogen-containing polymer. In one particular embodiment, for instance, the reactive agent may comprise a dialdehyde, such as a glyoxal or glutaraldehyde. A glyoxal or glutaraldehyde reactive agent, for example, is capable of reacting with the nitrogen-containing polymer and, optionally with the cellulose derivatives if present. A glyoxal when reacted with a nitrogen-containing polymer may form, for instance, an imine. In addition to a glyoxal or glutaraldehyde, various other reactive agents may be used. For instance, other reactive agents that may be incorporated into the formulation include borax, succinic dialdehyde, blocked glyoxal (12% glyoxal, 33% dipropylene glycol, and water), cationic amine polymer-epichlorohydrin, polyamide epichlorohydrin, potassium zirconium carbonate, ammonium zirconium carbonate, ketone formaldehyde, styrene maleic anhydride copolymer, cyclic amide condensate, and the like.

When contained in a cementitious composition, the components of the additive composition of the present disclosure may be added separately to the cementitious composition or can be first blended together and then added. In one embodiment, the reactive agent can be pre-reacted with a carrier prior to being incorporated into the cementitious composition. The carrier can consist of a cellulose ether, polyvinyl alcohol, starch, polyacrylamide, or other water soluble organic compound. Furthermore, the carrier can also be inorganic in nature, specifically a clay, calcium carbonate, calcium oxide, and the like. The amount of reactive agent contained within the additive composition can depend upon various factors and the desired result. In those embodiments where the carrier is present, the weight ratio of the carrier to the nitrogen-containing polymer can also vary depending upon the particular application. In one particular embodiment, for instance, the weight ratio of the nitrogen-containing polymer to the carrier can be from about 1:5 to about 5:1. For instance, the weight ratio of the nitrogen-containing polymer to the cellulose derivative can be from about 1:4 to about 4:1. In those embodiments where the additive additionally contains the cellulose derivative and the polyvinyl alcohol polymer the weight ratio of the cellulose derivative to the polyvinyl alcohol polymer can also vary. In one particular embodiment, for instance, the weight ratio of the polyvinyl alcohol polymer to the cellulose derivative can be from about 1:5 to about 5:1. For instance, the weight ratio of the polyvinyl alcohol polymer to the cellulose derivative can be from about 1:4 to about 4:1.

In one preferred aspect of the invention, the reactive agent is pre-reacted with a carrier such as cellulose in a reversible reaction. These components can be prepared or purchased, e.g., FQ grades of BERMOCOLL™ resins available from Akzo Nobel. The FQ grades of BERMOCOLL™ cellulose ethers are powders with delayed hydration which provide exceptional handling flexibility and control of solubilization rate. This delay of hydration has been achieved by reaction with glyoxal during production. In the chemical reaction, the polymer chains of the cellulose ether become linked to the bifunctional aldehyde glyoxal, forming a hemi-acetal. Cellulose ethers, crosslinked in this manner, lose their capability to hydrate but they are readily wetted out by cold water and will disperse uniformly without lumping, and with minimal agitation. In the acid pH range, and low temperature of the water, hemi-acetals are relatively stable. At higher pH values and temperatures seen in cement applications, the crosslinkers are broken and the cellulose ethers dissolve spontaneously, releasing the glyoxal as a reactive agent. FIG. 1 provides a schematic illustrating the release of glyoxal from the carrier.

In those embodiments where the additive additionally contains the cellulose derivative and the polyvinyl alcohol polymer the weight ratio of the cellulose derivative to the polyvinyl alcohol polymer can also vary. In one particular embodiment, for instance, the weight ratio of the polyvinyl alcohol polymer to the cellulose derivative can be from about 1:5 to about 5:1. For instance, the weight ratio of the polyvinyl alcohol polymer to the cellulose derivative can be from about 1:4 to about 4:1.

When incorporated into a mortar or cement product, the amount of the additive composition present in the product can vary. In general, however, very small amounts of the additive composition can produce the intended benefits and advantages. For instance, in general, the additive composition can be present in a cementitious composition in an amount less than about 5% by weight, such as less than about 3% by weight, such as even less than about 1% by weight, based upon the weight of the solids present.

The additive composition of the present invention can be incorporated into numerous different types of adhesive and construction products. Products that can be formulated with the additive composition include mortars, cements and joint compounds. Particular products, for instance, that can be made with the additive composition include tile adhesives, exterior insulation and finishing system adhesives, troweling compositions, leveling compounds, grouts, reinforcing mortars for exterior insulation and finishing systems, wood flooring adhesives, cementing compositions useful in cementing oil, gas and water wells, patching mortars, joint fillers, plasters, and the like.

In one embodiment, for instance, the additive composition of the present invention may be incorporated into a cementitious composition containing a binder and a filler. The binder may comprise, for instance, any suitable cement, such as Portland cement, gypsum, an aluminate, or mixtures thereof. The binder can be present in the cementitious composition in an amount from about 5% to about 80% by weight, such as from about 20% to about 50% by weight. When describing the cementitious composition, the above percentages by weight are based upon the weight percentage of dry material and thus exclude water if present in the product.

In general, the cementitious composition may contain any suitable filler. Fillers that may be used include, for instance, quartz sand, calcium carbonate such as limestone, talc, dolomite, aluminum silicates, mica, pumice, perlites, vermiculites, and mixtures thereof. Fillers can be present in the cementitious composition in an amount from about 10% to about 90% by weight, such as from about 40% to about 90% by weight, such as from about 60% to about 80% by weight.

As described above, the additive composition of the present invention may be present in the cementitious composition in relatively small amounts. The nitrogen-containing polymer may be present in the cementitious composition in an amount from about 0.01% to about 5% by weight, such as from about 0.1% to about 1% by weight. The nitrogen-containing polymer may be added to the cementitious composition either directly or in conjunction with the redispersible polymer powder as will be described in greater detail below. In one particular embodiment, for instance, the cellulose derivative may be present in the composition in an amount from about 0.1% to about 3% by weight, such as from about 0.3% to about 0.5% by weight. In yet another embodiment, the polyvinyl alcohol polymer may be present in the cementitious composition in an amount from about 0.05% to about 5% by weight, such as from about 0.05% to about 2% by weight. The polyvinyl alcohol polymer may also be added into the cementitious composition either directly and/or in conjunction with the redispersible polymer powder.

In addition to the above ingredients, the cementitious composition may contain various other components. For instance, in one embodiment, the cementitious composition may contain a water redispersible polymer powder. Redispersible polymer powders are polymer powders which break down in water into primary particles, which are then dispersed in the water.

Suitable redispersible polymers that may be used include, for instance, those based on one or more vinyl chlorides, styrenes, vinyl esters of unbranched or branched alkylcarboxylic acids having from 1 to 15 carbon atoms, methacrylic esters and acrylic esters of alcohols having from 1 to 10 carbon atoms, vinyl-aromatics, olefins, dienes, and vinyl halides as monomers or comonomers. It is also possible to use mixtures of these polymers made using one or more of the above-described monomers.

Suitable vinyl esters include vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids having from 5 to 11 carbon atoms, examples being VeoVa5®, VeoVa9®, VeoVa10® or VeoVa11® which are commercially available from Hexion Specialty Chemicals. Suitable methacrylic esters or acrylic esters are methyl acrylate, methyl methacrylate, ethyl acrylate, ethyl methacrylate, propyl acrylate, propyl methacrylate, n-butyl acrylate, n-butyl methacrylate, and 2-ethylhexyl acrylate. Suitable vinyl-aromatics are styrene, methylstyrene, and vinyltoluene. One example of a vinyl halide is vinyl chloride. Suitable olefins are ethylene and propylene, and suitable dienes are 1,3-butadiene and isoprene.

If desired, the polymers may also contain from 0.1 to 10% by weight, based on the overall weight of the polymer, of functional comonomer units, for example ethylenically unsaturated monocarboxylic or dicarboxylic acids such as acrylic acid; ethylenically unsaturated carboxamides such as (meth)acrylamide; ethylenically unsaturated sulfonic acids and/or their salts, preferably vinylsulfonic acid; polyethylenically unsaturated comonomers such as divinyl adipate, diallyl maleate, allyl methacrylate and triallyl cyanurate, and/or N-methylol(meth)acrylamides and their ethers, such as their isobutoxy or n-butoxy ethers.

Particular redispersible polymers that may be used include the following wherein the weight percentages provided below add up to 100% by weight, together, where appropriate, with the fraction of functional comonomer units.

From among the vinyl ester polymers: vinyl acetate polymers, vinyl acetate-ethylene copolymers with an ethylene content of from 1 to 60% by weight; vinyl ester-ethylene-vinyl chloride copolymers with an ethylene content of from 1 to 40% by weight and a vinyl chloride content of from 20 to 90% by weight; vinyl acetate copolymers with from 1 to 50% by weight of one or more copolymerizable vinyl esters such as vinyl laurate, vinyl pivalate, vinyl esters of an alpha-branched carboxylic acid, especially versatic acid vinyl esters, which may also contain from 1 to 40% by weight of ethylene; and vinyl acetate-acrylic ester copolymers with from 1 to 60% by weight of acrylic ester, especially methyl methacrylate, n-butyl acrylate, or 2-ethylhexyl acrylate, which may also contain from 1 to 40% by weight of ethylene.

From among the (meth)acrylic ester polymers: polymers of n-butyl acrylate or 2-ethylhexyl acrylate; copolymers of methyl methacrylate with n-butyl acrylate and/or 2-ethylhexyl acrylate; and copolymers of methyl methacrylate with 1,3-butadiene.

From among the vinyl chloride polymers, besides the abovementioned vinyl ester/vinyl chloride/ethylene copolymers: vinyl chloride-ethylene copolymers and vinyl chloride-acrylate copolymers.

Styrene polymers that may be used include: styrene-1,3-butadiene copolymers and styrene-acrylic ester copolymers such as styrene-n-butyl acrylate or styrene-2-ethylhexyl acrylate copolymers, each with a styrene content of from 10 to 70% by weight. Other styrene polymers are styrene-1,3-butadiene copolymers having a styrene content of from 10 to 70% by weight and a 1,3-butadiene content of from 30 to 90% by weight, with or without the abovementioned functional comonomer units, the fractions in % by weight adding up to 100% by weight.

Aqueous polymer dispersions and the water-redispersible powders of the abovementioned polymers that are obtainable from them by drying are known and are available commercially. The polymers are prepared in a conventional manner, preferably by an emulsion polymerization process. The dispersions used may be stabilized with an emulsifier or else with a protective colloid, an example being polyvinyl alcohol.

Polyvinyl alcohols that may be used include those that are partially (or intermediate) hydrolyzed and have a degree of hydrolysis of from about 80 up to about 95 mole percent. Likewise, so called "fully" hydrolyzed polyvinyl alcohol having a degree of hydrolysis of more than 95% can be used. The polyvinyl alcohol particles can be incorporated into the redispersible polymer in order to stabilize the composition. Polyvinyl alcohol can be incorporated into the redispersible polymer composition, for instance, in an amount from about 4% to about 20% by weight. Greater amounts of polyvinyl alcohol powders may also be added for various other reasons. For instance, polyvinyl alcohol powders have been incorporated into cementitious compositions in order to improve the workability of the composition when wet and also to improve mechanical adhesion strength. In the past, redispersible polymer powders were typically present in cementitious compositions in an amount of about 0.5% to about 16% by weight.

Although redispersible polyvinyl alcohol powders can provide various benefits and advantages when incorporated into a cementitious composition, unfortunately such redispersible polymers can significantly affect the cost of the final product, as well as altering the balance of performance in such a composition. For example, in a cementitious tile adhesive, high levels of redispersible powders impart good flexibility, freeze-thaw resistance, and resistance to heat aging; however, those same high levels of redispersible powder tend to negatively impact properties like water immersion resistance and resistance to slip on a horizontal surface.

In one embodiment of the present invention, by incorporating the additive composition of the present invention into the cementitious composition, the amount of redispersible polymer present in the composition can be drastically reduced or even negated without adversely interfering with the physical properties of the resulting product. More particularly, cementitious compositions can be formulated in accordance with the present disclosure that contain a redispersible polymer in an amount from 0% to about 16% by weight, such as less than about 2% by weight. For instance, in one embodiment, a redispersible polymer may be present in the cementitious composition in an amount less than about 1% by weight, such as less than about 0.5% by weight.

As will become apparent from the examples which follow, benefits seen include, for example, improved slip and water resistance in tile adhesives, as well as reduced cost.

In an alternative embodiment, the nitrogen-containing polymer can be incorporated into a redispersible polymer powder which is then added to the cementitious composition. For example, in one embodiment, all or a portion of the polyvinyl alcohol contained in the redispersible polymer can be replaced with a nitrogen-containing polymer. Thus, a redispersible polymer composition can be formulated in accordance with the present disclosure that contains a nitrogen-containing polymer in an amount from about 4% to about 20% by weight, such as in an amount from about 8% to about 14% by weight. Again, the nitrogen-containing polymer can be used alone or in conjunction with polyvinyl alcohol particles in the redispersible polymer composition.

In addition to the above components, the cementitious composition can contain various other ingredients and additives. For instance, the cementitious composition may also contain defoamers, dispersing aids, antioxidants, and the like. Antioxidants that may be contained in the composition include, for instance, one or more sterically hindered phenol or hydroquinone, aromatic amine, organosulfur compound, phosphite, and phosphonite antioxidants.

Other additives that may be contained in the cementitious composition include accelerators, retardants, standardizers, air pore formers, and natural or synthetic polymer fibers.

In one embodiment, for instance, the composition may also contain a lubricant, such as sodium stearate. The sodium stearate may be present in an amount less than about 5% by weight, such as in an amount from about 0.1% to about 2% by weight.

Cementitious compositions made in accordance with the present invention may be formulated so that the compositions are easily workable when combined with water, have good mechanical adhesive strength properties (as tensile, compressive and/or shear) and set properties in an appropriate amount of time.

The nitrogen-containing polymer improves a wide range of properties of the cementitious composition, especially the working properties of the composition and may also increase the tensile strength and mechanical adhesion properties of the product. It is believed that the optionally present components of the additive composition may work synergistically together with the nitrogen-containing polymer to improve the properties of a cementitious composition. For instance, inclusion of the cellulose derivative is believed to increase the water retention capacity of the resulting composition, increase the workability of the composition when combined with water, and improve the stability of the resulting product under load. The polyvinyl alcohol polymer is believed to improve the working properties of a cementitious composition and, in some embodiments, to increase the tensile strength of the resulting product. The polyvinyl alcohol polymer may also improve the mechanical adhesion properties of the product.

When a cementitious composition is combined with water, although unknown, it is believed that the reactive agent may undergo a crosslinking reaction with the nitrogen-containing polymer. In particular, when the cementitious composition is combined with water, the pH of the composition may be alkaline which may cause the reactive agent, such as the glyoxal, to react with the nitrogen-containing polymer. Nitrogen-containing polymers undergo relatively fast crosslinking reactions. Thus, it is believed that the properties of the nitrogen-containing polymer, optionally combined with the other components of the additive composition result in a better balance of attributes that when mixed with the cementitious components results in enhanced properties. In addition, all of these improvements are realized while also minimizing the amount of redispersible polymer present in the composition to achieve desired physical properties.

The present disclosure may be better understood with reference to the following examples.

EXAMPLES

The following examples were conducted in order to demonstrate some of the advantages and benefits of the present disclosure.

The following tests for cementitious tile adhesives were conducted in the following examples and fall under the European Norm 12004:
Open time (minutes): EN 1346
Tensile Strength @ 5 minutes and Tensile Strength @ 10 minutes (Nw/mm$^2$): EN 1348
Tensile Adhesion Strength after water immersion: EN 1348
Tensile Strength after heat aging: EN 1348
Tensile Strength after freeze-thaw cycles: EN 1348
Deformation/Flexibility: EN 12002

Further cementitious tile adhesive tests were also conducted and tested under Mexican Specifications:

Shear Resistance (kg/cm$^2$): Test No. NMX-C-420 ONNCCE (2003)
Compressive Strength (kg/cm$^2$): Test No. NMX-C-420 ONNCCE(2003)

For Joint Compounds, testing was conducted in accordance with EN 13963.
Hardening Time Paragraph 5.2
Determination of the absence of fissures: Paragraph 5.3
Determination of the absence of large particles: Paragraph 5.4
Determination of adhesion/cohesion: Paragraph 5.5
Determination of Break Load by Flex: Paragraph 5.8.2

For Exterior Insulation and Finishing Systems (EIFS), testing was conducted in accordance with ETAG 004.
Water Absorption (capillarity test): Section 5.1.3.1
Freeze-thaw Behavior: Section 5.1.3.2.2
Resistance to Perforation (Perfotest): Section 5.1.3.3.2
Base Coat to Insulation Bond Strength: Section 5.1.4.1.1

Example Series 1

In this example, various cementitious tile adhesive compositions were formulated. Specifically, tile adhesive mortar formulated only with a redispersible polymer was compared to formulations containing a derivatized cellulose, a reactive agent, polyvinyl alcohol polymer, and a vinyl alcohol and vinyl amine copolymer in accordance with the present disclosure. After the tile adhesive compositions were formulated, water was added and the composition was allowed to harden.

The following table lists the ingredients used to formulate the tile adhesive compositions. Water was added to each example so that all of the samples had the same consistency. The produced samples were then tested for various properties as shown in Table 1, below.

TABLE 1

| Tile Adhesive Ingredients | Control | Sample 1-1 | Sample 1-2 |
|---|---|---|---|
| Base Mortar (Cement/Filler) | 97% | 97% | 97% |
| Cellulose ether-glyoxal product | 0.24% | 0.24% | 0.24% |
| Re-dispersible powder | 3% | 0% | 0% |
| Vinyl alcohol and vinyl amine copolymer containing 6 mole percent vinyl amine* | 0% | 2.76% | 0% |
| Vinyl alcohol and vinyl amine copolymer containing 12 mole percent vinyl amine** | 0% | 0% | 2.76% |
| Water | 21% | 33.3% | 28.6% |
| Open Time (minutes) | 25 | 52 | 22 |
| Tensile Strength @ 5' minutes (Nw/mm$^2$) | 2.4 | 2.3 | 2.8 |
| Tensile strength @ 10' minutes (Nw/mm$^2$) | 2.0 | 1.5 | 2.7 |
| Shear resistance (kg/cm$^2$) | 27 | 17 | 21 |
| Compressive Strength (kg/cm$^2$) | 40 | 15 | 21 |

*referred to hereinafter as VaVam 6
**referred to hereinafter as VaVam 12

The base mortar contained 80% calcium carbonate and 20% Portland cement. The cement was Portland cement type CPC 30 sold under the tradename TOLTECA by Cemex. The calcium carbonate was obtained from Derivados Macroquimicos S. A. de C. V. The cellulose ether/glyoxal product was obtained from Derivados Macroquimicos S. A. de C. V and had a glyoxal content of 0.1:1. The redispersible polymer used in the examples was a polyvinyl acetate ethylene copolymer powder commercially available from Wacker Polymer Systems GmbH under the trade name VINNAPAS 5010. The polyvinyl alcohol polymer and the vinyl alcohol and vinyl amine copolymers were obtained commercially from the Celanese Corporation.

As shown above, incorporating the additive composition of the present disclosure into a mortar composition allows for the reduction in redispersible powder without significantly adversely affecting the physical properties. In fact, Sample 2 showed an increase in tensile strength over the control. Of particular advantage, incorporation of the additive composition into Sample 1 dramatically increased the open time of the formulation.

Although decreases were observed in shear resistance and compressive strength, it is believed that these decreases are due to the high water content used to achieve uniform mortar consistency.

Example Series 2

In this example, further cementitious compositions were formulated and tested.

The following table lists the ingredients used to formulate the adhesive compositions. The produced samples were then tested for various properties as shown in Table 2, below.

TABLE 2

| Tile Adhesive | Sample 2-1 | Sample 2-2 | Sample 2-3 | Sample 2-4 | Sample 2-5 | Sample 2-6 | Sample 2-7 |
|---|---|---|---|---|---|---|---|
| Cement (%) | 14.954 | 14.9 | 14.808 | 14.808 | 28.124 | 26.634 | 28.124 |
| Hydroxyl propyl methyl cellulose (%) | 0.239 | 0.238 | 0.237 | 0.237 | 0.225 | 0.213 | 0.225 |
| PVOH type | VaVam 12 | VaVam 6 | C540S | VaVam 6 | VaVam 12 | VaVam 12 | C540S |
| PVOH amount (%) | 0.06 | 0.397 | 0.059 | 0.059 | 0.375 | 0.355 | 0.375 |
| Cross linker Type | BORAX | BORAX | GLYOXAL | GLYOXAL | BORAX | GLYOXAL | BORAX |
| Cross linker amount (%) | 0.005 | 0.03 | 0.987 | 0.987 | 0.028 | 5.327 | 0.028 |
| Calcium Carbonate (100 mesh) (%) | 52 | 52 | 51 | 51 | 54 | 51 | 54 |
| Calcium carbonate (324 mesh) (%) | 32.9 | 32.78 | 32.577 | 32.77 | 16.874 | 15.98 | 16.874 |
| Open time (min) | 19 | 30 | 22 | 23 | 23 | 17 | 12 |
| Water retention (%) | 23.7 | 26.88 | 23.14 | 23.03 | 24.65 | 24.76 | 24.85 |
| Adjustability (min) | 20 | 25 | 17.5 | 22.5 | 22.5 | 22.5 | 7.5 |
| Open time by tensile adhesion strength after 10 minutes (Nw/mm$^2$) | 1.38 | 1.86 | 0.97 | 1.26 | 1.95 | 1.49 | 1.72 |
| Tensile adhesion strength after water immersion (Nw/mm$^2$) | 0.65 | 0.65 | 0.61 | 0.71 | 1.25 | 1.14 | 1.59 |

TABLE 2-continued

| Tile Adhesive | | | | | | | |
|---|---|---|---|---|---|---|---|
| Tensile adhesion strength after heat aging (Nw/mm$^2$) | 1.82 | 1.68 | 1.55 | 0.7 | 2.41 | 2.03 | 3.05 |
| Compressive strength (kg/cm$^2$) | 36 | 14 | 18 | 23 | 120 | 122 | 126 |
| Shear adhesion strength (kg/cm$^2$) | 8 | 8 | 7 | 11 | 27 | 32 | 20 |

| Tile Adhesive | Sample 2-8 | Sample 2-9 | Sample 2-10 | Sample 2-11 | Sample 2-12 | Sample 2-13 | Sample 2-14 |
|---|---|---|---|---|---|---|---|
| Cement (%) | 26.634 | 28.221 | 14.9 | 14.954 | 28.221 | 14.066 | 14.9 |
| Hydroxyl propyl methyl cellulose (%) | 0.213 | 0.226 | 0.238 | 0.239 | 0.226 | 0.225 | 0.238 |
| PVOH type | VaVam 6 | C540S | C540S | C540S | VaVam 6 | VaVam 12 | VaVam 12 |
| PVOH amount (%) | 0.355 | 0.056 | 0.397 | 0.06 | 0.056 | 0.375 | 0.397 |
| Cross linker Type | GLYOXAL | BORAX | BORAX | BORAX | BORAX | GLYOXAL | BORAX |
| Cross linker amount (%) | 5.327 | 0.005 | 0.03 | 0.005 | 0.005 | 5.626 | 0.03 |
| Calcium Carbonate (100 mesh) (%) | 51 | 55 | 52 | 52 | 55 | 49 | 52 |
| Calcium carbonate (324 mesh) (%) | 15.98 | 16.932 | 32.78 | 32.9 | 16.932 | 30.945 | 32.78 |
| Open time (min) | 24 | 18 | 10 | 25 | 19 | 15 | 22 |
| Water retention (%) | 26.92 | 23.74 | 23.89 | 23.95 | 24.4 | 24.55 | 25 |
| Adjustability (min) | 2705 | 17.5 | 5 | 17.5 | 20 | 17.5 | 17.5 |
| Open time by tensile adhesion strength after 10 minutes (Nw/mm$^2$) | 1.87 | 1.52 | 1.24 | 1.14 | 1.53 | 1.4 | 1.8 |
| Tensile adhesion strength after water immersion (Nw/mm$^2$) | 1.21 | 1.11 | 0.64 | 0.69 | 1.09 | 0.78 | 0.66 |
| Tensile adhesion strength after heat aging (Nw/mm$^2$) | 2.23 | 2.75 | 1.17 | 0.85 | 1.8 | 1.23 | 0.94 |
| Compressive strength (kg/cm$^2$) | 125 | 175 | 37 | 35 | 166 | 29 | 24 |
| Shear adhesion strength (kg/cm$^2$) | 31 | 30 | 5 | 14 | 50 | 24 | 18 |

| Tile Adhesive | Sample 2-15 | Sample 2-16 | Sample 12-7 | Sample 2-18 | Sample 2-19 | Sample 2-20 | Sample 2-21 |
|---|---|---|---|---|---|---|---|
| Cement (%) | 28.221 | 26.634 | 28.124 | 27.959 | 14.954 | 14.066 | 27.959 |
| Hydroxyl propyl methyl cellulose (%) | 0.226 | 0.213 | 0.225 | 0.224 | 0.239 | 0.225 | 0.224 |
| PVOH type | VaVam 12 | C540S | VaVam 6 | VaVam 12 | VaVam 6 | C540S | VaVam 6 |
| PVOH amount (%) | 0.056 | 0.355 | 0.375 | 0.056 | 0.06 | 0.375 | 0.056 |
| Cross linker Type | BORAX | GLYOXAL | BORAX | GLYOXAL | BORAX | GLYOXAL | GLYOXAL |
| Cross linker amount (%) | 0.005 | 5.327 | 0.028 | 0.0932 | 0.005 | 5.626 | 0.932 |
| Calcium Carbonate (100 mesh) (%) | 55 | 51 | 54 | 54 | 52 | 49 | 54 |
| Calcium carbonate (324 mesh) (%) | 16.932 | 15.98 | 16.874 | 16.775 | 32.9 | 30.945 | 16.775 |
| Open time (min) | 18 | 10 | 30 | 20 | 23 | 12 | 20 |
| Water retention (%) | 23.43 | 23.36 | 26.21 | 23.6 | 24.5 | 23.9 | 24.36 |
| Adjustability (min) | 20 | 12.5 | 22.5 | 22.5 | 17.5 | 7.5 | 22.5 |
| Open time by tensile adhesion strength after 10 minutes (Nw/mm$^2$) | 1.8 | 1.99 | 2.82 | 0.99 | 1.31 | 0.91 | 1.3 |
| Tensile adhesion strength after water immersion (Nw/mm$^2$) | 1.24 | 1.21 | 1.3 | 1.4 | 0.643 | 0.64 | 1.05 |
| Tensile adhesion strength after heat aging (Nw/mm$^2$) | 2.23 | 1.82 | 2.3 | 2.95 | 0.45 | 0.44 | 1.99 |
| Compressive strength (kg/cm$^2$) | 181 | 166 | 138 | 156 | 20 | 26 | 154 |
| Shear adhesion strength (kg/cm$^2$) | 46 | 35 | 29 | 28 | 18 | 7 | 26 |

| Tile Adhesive | Sample 2-22 | Sample 2-23 | Sample 2-24 |
|---|---|---|---|
| Cement (%) | 27.959 | 14.808 | 14.066 |
| Hydroxyl propyl methyl cellulose (%) | 0.224 | 0.237 | 0.225 |
| PVOH type | C540S | VaVam 12 | VaVam 6 |
| PVOH amount (%) | 0.056 | 0.059 | 0.375 |
| Cross linker Type | GLYOXAL | GLYOXAL | GLYOXAL |
| Cross linker amount (%) | 0.932 | 0.987 | 5.626 |
| Calcium Carbonate (100 mesh) (%) | 54 | 51 | 49 |
| Calcium carbonate (324 mesh) (%) | 16.775 | 32.577 | 30.945 |

TABLE 2-continued

| | | | |
|---|---|---|---|
| Open time (min) | 18 | 19 | 32 |
| Water retention (%) | 23.44 | 23.93 | 27.3 |
| Adjustability (min) | 17.5 | 7.5 | 25 |
| Open time by tensile adhesion strength after 10 minutes (Nw/mm$^2$) | 1.65 | 0.66 | 1.75 |
| Tensile adhesion strength after water immersion (Nw/mm$^2$) | 1.44 | 0.62 | 0.6 |
| Tensile adhesion strength after heat aging (Nw/mm$^2$) | 2.26 | 0.04 | 0.78 |
| Compressive strength (kg/cm$^2$) | 156 | 18 | 19 |
| Shear adhesion strength (kg/cm$^2$) | 17 | 13 | 5 |

The cement was Portland cement type CPC 30 sold under the tradename TOLTECA by Cemex. The calcium carbonate was obtained from Derivados Macroquimicos S. A. de C. V. The cellulose ether/glyoxal product was obtained from Derivados Macroquimicos S. A. de C. V and had a glyoxal content of 0.1:1. The redispersible polymer used in the examples was a polyvinyl acetate ethylene copolymer powder commercially available from Wacker Polymer Systems GmbH under the trade name VINNAPAS 5010. The polyvinyl alcohol polymer and the vinyl alcohol and vinyl amine copolymers were obtained commercially from the Celanese Corporation.

As shown above in the table, the compositions made according to the present disclosure exhibited very favorable properties. The table also shows that the mortar adhesive attributes can be balanced inside a broad range of values.

Example Series 3

In this example, further cementitious compositions were formulated and tested.

The following table lists the ingredients used to formulate the adhesive compositions. The produced samples were then tested for various properties as shown in Table 3, below.

TABLE 3

| Tile Adhesive Ingredients | Control | Sample 3-1 | Sample 3-2 | Sample 3-3 | Sample 3-4 |
|---|---|---|---|---|---|
| Cement | 28.74% | 29.46% | 29.51% | 24.66% | 24.36% |
| Hydroxyl propyl methyl cellulose | 0.38% | 0.39% | .39% | 0.15% | .39% |
| Re-dispersible powder | 3.83% | 0.98% | 0.98% | 0.99% | 1.95% |
| Copolymer vinyl Alcohol Vinyl Amine | 0.00% | 0.29% | 0.10% | 0.10% | 0.10% |
| Polyvinyl Alcohol | 0.00% | 0.10% | 0.10% | 0.10% | 0.10% |
| Glyoxal/HPMC | 0.00% | 0.03% | 0.05% | 0.03% | 0.03% |
| Calcium Carbonate pass 325 mesh | 67.05% | 68.74% | 68.86% | 73.98% | 73.07% |
| Open time (min) | 43 | 46 | 44 | 18 | 35 |

TABLE 3-continued

| Tile Adhesive Ingredients | Control | Sample 3-1 | Sample 3-2 | Sample 3-3 | Sample 3-4 |
|---|---|---|---|---|---|
| Adjustability | 45 | 35 | 57.5 | 12.5 | 17.5 |
| Tensile strength after 5' minutes (Nw/mm$^2$) | 1.6 | 1.5 | 1.6 | 1.3 | 1.8 |
| Tensile strength after 15' minutes (Nw/mm$^2$) | 2.8 | 2.6 | 1.8 | 1.7 | 2.3 |
| Tensile Strength after water immersion (Nw/mm$^2$) | 0.8 | 0.9 | 0.8 | 0.8 | 0.8 |
| Tensile Strength after heat aging (Nw/mm$^2$) | 2 | 1.4 | 1.3 | 0.9 | 1.2 |
| Compressive strength (kg/cm$^2$) | 145 | 112 | 124 | 152 | 111 |
| Shear adhesion strength (kg/cm$^2$) | 36 | 20 | 22 | 32 | 30 |

The cement was Portland cement type CPC 30 sold under the tradename TOLTECA by Cemex. The calcium carbonate was obtained from Derivados Macroquimicos S. A. de C. V. The cellulose ether/glyoxal product was obtained from Derivados Macroquimicos S. A. de C. V. The redispersible polymer used in the examples was a polyvinyl acetate ethylene copolymer powder commercially available from Wacker Polymer Systems GmbH under the trade name VINNAPAS 5010. The polyvinyl alcohol polymer and the vinyl alcohol and vinyl amine copolymers were obtained commercially from the Celanese Corporation.

As shown in the table above, the samples made according to the present disclosure generally exhibited about the same or better properties than the Control Sample.

Example Series 4

In this example, further cementitious compositions were formulated and tested.

The following table lists the ingredients used to formulate the adhesive compositions. The produced samples were then tested for various properties as shown in Table 4, below.

TABLE 4

| Tile Adhesive | Control | Sample 4-1 | Sample 4-2 | Sample 4-3 | Sample 4-4 | Sample 4-5 | Sample 4-6 |
|---|---|---|---|---|---|---|---|
| Cement (%) | 28.74 | 28.68 | 29.53 | 29.47 | 29.53 | 29.41 | 29.47 |
| Hydroxyl propyl methyl cellulose (%) | 0.38 | 0.38 | 0.39 | 0.39 | 0.39 | 0.39 | 0.39 |
| Re-dispersible powder (%) | 3.83 | 3.82 | 0.98 | 0.98 | 0.98 | 0.98 | 0.98 |
| Copolymer vinyl Alcohol Vinyl Amine (%) | 0 | 0.1 | 0.1 | 0.29 | 0.1 | 0.29 | 0.1 |

TABLE 4-continued

| Tile Adhesive | | | | | | | |
|---|---|---|---|---|---|---|---|
| PVOH type | — | 165SF | 165SF | 165SF | C540S | C540S | 165SF |
| PVOH (%) | 0 | 0.1 | 0.1 | 0.1 | 0.1 | 0.29 | 0.29 |
| Borax (%) | 0 | 0.0019 | 0.0039 | 0.0039 | 0.002 | 0.002 | 0.0039 |
| Calcium Carbonate (%) | 67.05 | 66.92 | 68.89 | 68.76 | 68.9 | 68.63 | 68.76 |
| Open Time (min) | 38 | 33 | 37 | 35 | 28 | 39 | 26 |
| Open time by tensile adhesion strength after 15 minutes (Nw/mm$^2$) (Adhesion Type ISO-C1) | 2.07 | 1.83 | 1.46 | 2.02 | 2.24 | 2.32 | 2.12 |
| Open time by tensile adhesion strength after 5 minutes (Nw/mm$^2$) (Adhesion Type ISO-C2) | 2.51 | 2.32 | 2.18 | 2.04 | 2.57 | 1.42 | 2.24 |
| Tensile adhesion strength after water immersion (Nw/mm$^2$) (Adhesion Type ISO-C2) | 0.65 | 1.36 | 1.16 | 1.09 | 1.22 | 0.75 | 1.35 |
| Tensile adhesion strength after heat aging(Nw/mm$^2$) (Adhesion Type ISO-C2) | 1.9 | 2.43 | 2.17 | 1.95 | 2.1 | 1.34 | 2.26 |
| Compressive strength(kg/cm$^2$) | 108 | 116 | 107 | 89 | 94 | 106 | 87 |
| Shear adhesion strength(kg/cm$^2$) | 26 | 28.28 | 28.59 | 27.34 | 25.68 | 34.84 | 29.84 |
| Tensile adhesion strength after 5 minutes(Nw/mm$^2$) (Adhesion Type ISO-C2) | 2.18 | 2.27 | 2.53 | 2.36 | 1.6 | 2.07 | 2.46 |
| Tensile adhesion strength after water immersion (Nw/mm$^2$) (Adhesion Type ISO-C2) | — | 1.32 | 1.18 | 1.17 | 1.34 | 0.84 | 1.07 |
| Tensile adhesion strength after heat aging(Nw/mm$^2$) (Adhesion Type ISO-C1) | 2.43 | 1.53 | 1.7 | 2.21 | 2.33 | 1.9 | 2.22 |

| Tile Adhesive | Sample 4-7 | Sample 4-8 | Sample 4-9 | Sample 4-10 | Sample 4-11 | Sample 4-12 |
|---|---|---|---|---|---|---|
| Cement (%) | 29.47 | 29.47 | 29.47 | 29.41 | 29.41 | 29.53 |
| Hydroxyl propyl methyl cellulose (%) | 0.39 | 0.39 | 0.39 | 0.39 | 0.39 | 0.39 |
| Re-dispersible powder (%) | 0.98 | 0.98 | 0.98 | 0.98 | 0.98 | 0.98 |
| Copolymer vinyl Alcohol Vinyl Amine (%) | 0.1 | 0.29 | 0.29 | 0.29 | 0.29 | 0.1 |
| PVOH type | C540S | C540S | C540S | 165SF | C450S | C450S |
| PVOH (%) | 0.29 | 0.1 | 0.1 | 0.29 | 0.29 | 0.1 |
| Borax (%) | 0.002 | 0.0039 | 0.002 | 0.002 | 0.0039 | 0.0039 |
| Calcium Carbonate (%) | 68.76 | 68.76 | 68.76 | 68.63 | 68.62 | 68.89 |
| Open Time (min) | 36 | 35 | 33 | 42 | 41 | 42 |
| Open time by tensile adhesion strength after 15 minutes (Nw/mm$^2$) (Adhesion Type ISO-C2) | 2.39 | 2.64 | 2.19 | 2.23 | 2.34 | 2.32 |
| Open time by tensile adhesion strength after 5 minutes (Nw/mm$^2$) (Adhesion Type ISO-C2) | 1.96 | 2.38 | 2.18 | 2.34 | 1.99 | 2.14 |
| Tensile adhesion strength after water immersion (Nw/mm$^2$) (Adhesion Type ISO-C2) | 1.01 | 0.96 | 1.34 | 1.26 | 0.88 | 1.27 |
| Tensile adhesion strength after heat aging (Nw/mm$^2$) (Adhesion Type ISO-C2) | 1.97 | 1.91 | 2.72 | 2.11 | 1.39 | 1.88 |
| Compressive strength(kg/cm$^2$) | 110 | 97 | 101 | 107 | 109 | 93 |
| Shear adhesion strength(kg/cm$^2$) | 25.48 | 29.08 | 32.81 | 25.62 | 31.19 | 25.21 |
| Tensile adhesion strength after 5 minutes(Nw/mm$^2$) (Adhesion Type ISO-C1) | 2.17 | 2.35 | 2.27 | 2.09 | 2.03 | 2.25 |
| Tensile adhesion strength after water immersion (Nw/mm$^2$)(Adhesion Type ISO-C1) | 0.92 | 1.2 | 1.14 | 1.28 | 0.78 | 1.35 |
| Tensile adhesion strength after heat aging(Nw/mm$^2$) (Adhesion Type ISO-C1) | 2.35 | 2.72 | 2.13 | 2.41 | 2.29 | 2.28 |

| Tile Adhesive | Sample 4-13 | Sample 4-14 | Sample 4-15 | Sample 4-16 | Sample 4-17 | Sample 4-18 |
|---|---|---|---|---|---|---|
| Cement (%) | 29.47 | 29.47 | 29.47 | 29.47 | 29.41 | 29.47 |
| Hydroxyl propyl methyl cellulose (%) | 0.39 | 0.39 | 0.39 | 0.39 | 0.39 | 0.39 |
| Re-dispersible powder (%) | 0.98 | 0.98 | 0.98 | 0.098 | 0.98 | 0.98 |
| Copolymer Vinyl Alcohol Vinyl Amine (%) | 0.29 | 0.2 | 0.1 | 0.1 | 0.29 | 0.2 |
| PVOH type | 165SF | 165SF | 165SF | C540S | 165SF | C540S |
| PVOH (%) | 0.1 | 0.2 | 0.29 | 0.29 | 0.29 | 0.2 |
| Borax (%) | 0.002 | 0.0029 | 0.002 | 0.0039 | 0.0039 | 0.0029 |
| Calcium Carbonate (%) | 68.76 | 68.76 | 68.76 | 68.76 | 68.62 | 68.76 |
| Open Time (min) | 50 | 37 | 41 | 33 | 38 | 37 |
| Open time by tensile adhesion strength after 15 minutes (Nw/mm$^2$) (Adhesion Type ISO-C2) | 2.13 | 1.87 | 1.82 | 2.16 | 2.54 | 2.37 |

TABLE 4-continued

| | | | | | | |
|---|---|---|---|---|---|---|
| Open time by tensile adhesion strength after 5 minutes (Nw/mm²) (Adhesion Type ISO-C2) | 2.02 | 1.61 | 2.16 | 1.83 | 2 | 1.99 |
| Tensile adhesion strength after water immersion (Nw/mm²) (Adhesion Type ISO-C2) | 1.23 | 1.39 | 1.07 | 0.76 | 1.15 | 1.22 |
| Tensile adhesion strength after heat aging (Nw/mm²) (Adhesion Type ISO-C2) | 1.81 | 2.1 | 2.03 | 1.54 | 1.5 | 1.9 |
| Compressive strength(kg/cm²) | 105 | 92 | 88 | 102 | 113 | 126 |
| Shear adhesion strength(kg/cm²) | 27.97 | 29.64 | 37.33 | 31.13 | 37.03 | 29.1 |
| Tensile adhesion strength after 5 minutes (Nw/mm²) (Adhesion Type ISO-C1) | 2.06 | 1.95 | 2.25 | 2.27 | 2.51 | 2.44 |
| Tensile adhesion strength after water immersion (Nw/mm²)(Adhesion Type ISO-C1) | 0.98 | 1.08 | 0.93 | 0.92 | 1.02 | 1.07 |
| Tensile adhesion strength after heat aging(Nw/mm²) (Adhesion Type ISO-C1) | 2.18 | 2.4 | 1.91 | 1.91 | 2 | 1.9 |

The cement was Portland cement type CPC 30 sold under the tradename TOLTECA by Cemex. The calcium carbonate was obtained from Derivados Macroquimicos S. A. de C. V. The cellulose ether/glyoxal product was obtained from Derivados Macroquimicos S. A. de C. V and had a glyoxal content of 0.1:1. The redispersible polymer used in the examples was a polyvinyl acetate ethylene copolymer powder commercially available from Wacker Polymer Systems GmbH under the trade name VINNAPAS 5010. The polyvinyl alcohol polymer and the vinyl alcohol and vinyl amine copolymers were obtained commercially from the Celanese Corporation.

As shown in the table above, samples made according to the present disclosure exhibited very favorable properties in comparison to the Control. Sample Nos. 10 and 11 particularly demonstrated improved properties.

Example Series 5

Multifunctional Components

The various components of the inventive compositions can be added as separate components or combined as a multifunctional component for ease of handling and formulation. One aspect of practicing the present invention is to incorporate the nitrogen-containing polymer into a redispersible powder composition as a stabilizer when preparing the redispersible powder emulsion. One might employ, for example, a PVOH-VAM copolymer, 6 mole % nitrogen as a stabilizer when preparing a redispersible powder emulsion as described in the examples appearing immediately below.

Polyvinyl acetate based emulsion stabilized with 6 mole % nitrogen PVOH-VAM copolymer:
Equipment:
A 2 liter glass reactor was equipped with a tempered water jacket, mechanical stirrer, feed lines and thermocouple.
Feed solutions:
Monomers: vinyl acetate (VAM) and optionally vinyl versatate (VeoVa)
  52013-145: 776 g VAM and 258 g VeoVa
  52013-149: 775 g VAM and 258 g VeoVa
  Stabilizer blend
  52013-145: 72 g Celvol 504 Polyvinyl alc. +52 g Vinyl alcohol–vinyl amine copolymer, 12% in water
  52013-149: 62 g Celvol 504 Polyvinyl alc. +62 g Vinyl alcohol–vinyl amine copolymer, 11% in water
  Initiator: Potassium persulfate(PPS) 3.0% w/w in water
  Buffer: Sodium Acetate 5% w/w in water
  Surfactant: Sodium Lauryl Sulfate (SLS) 20% w/w in water
  Antifoam: 116 FG (as is) (HARCROS)
  Redox: Hydrogen peroxide ($H_2O_2$)
  Sodium formate salt (SFS)

Sample 5-1
Procedure:
The reactor was charged with

| | |
|---|---|
| Monomers | 119 g |
| Stabilizer blend | 915 g |
| Antifoam | 0.9 g |
| SLS | 9.0 g |

The contents were heated to 65° C. with moderate (200 rpm) stirring, and Initiator (19.9 g) added. The temperature is raised and controlled at 80° C.

After 10 minutes of stirring, feeds were initiated and maintained.

| | | |
|---|---|---|
| Monomers | 2.25 g/min | 300 minutes |
| Initiator: | 0.18 g.min | 340 minutes |

At 300 min, the temperature was raised to 85° C.

The reactor was stirred for an additional 30 minutes, then cooled to 50° C. $H_2O_2$ (22.2 g) and SFS (16.0 g) were added to quench the polymerization and initiator, and the system cooled to 30° C. The emulsion was spray dried to yield Sample 52013-45.

Sample 5-2
Procedure:
The reactor was charged with

| | |
|---|---|
| Monomers | 119 g |
| Stabilizer blend | 930 g |
| Antifoam | 0.9 g |
| SLS | 6.75 g |

The contents were heated to 65° C. with moderate (200 rpm) stirring, and Initiator (16.6 g) added. The temperature is raised and controlled at 80° C.

After 10 minutes of stirring, feeds were initiated and maintained.

| | | |
|---|---|---|
| Monomers | 2.25 g/min | 300 minutes |
| Initiator: | 0.18 g.min | 340 minutes |

At 300 min, the temperature was raised to 85° C.

The reactor was stirred for an additional 30 minutes, then cooled to 50° C. $H_2O_2$ (22.2 g) and SFS (16.0 g) were added to quench the polymerization and initiator, and the system cooled to 30° C. The emulsion was spray dried to yield Sample 52013-149.

The powders prepared had the following assays:

| Sample# | 5-1 | 5-2 |
|---|---|---|
| VAM-VeoVa copolymer | 89.3% | 89.3% |
| Polyvinyl alcohol | 6.2% | 5.4% |
| Vinyl alcohol-vinyl amine copolymer | 4.5% | 5.4% |

Experiment 6-21 below used a 1:1 blend of the Sample 5-1 material and the Sample 5-2 material.
Experiment 6-22 below used the Sample 5-1 material.

Example Series 6

Following the procedures generally discussed above, a further series of compositions was prepared and tested. Details and results appear in Tables 5 through 12, below:

TABLE 5

Ingredient Source and Description

| Ingredient Name | Company Information | Brief Description |
|---|---|---|
| Electroland 42.5R | Cementos Molins (Spain) | 42.5R rated Portland Cement |
| H33/H35 Blend | Quarzwerke (Germany) | 1 Part H33 to 4 parts H35 Blend |
| MO 60016P4 | SE Tylose (Germany) | Hydroxypropylmethylcellulose |
| MOT 60000YP4 | SE Tylose (Germany) | Solubility controlled Hydroxypropylmethylcellulose |
| MH 60001 P4 | SE Tylose (Germany) | Hydroxyethylmethylcellulose |
| MHS 60000YP4 | SE Tylose (Germany) | Solubility controlled Hydroxyethylmethylcellulose |
| Culminal 1034 | Hercules (US) | Hydroxypropylmethylcellulose |
| Culminal 1034R | Hercules (US) | Solubility controlled Hydroxypropylmethylcellulose |
| Demacol 30MN | Demacsa (Mexico) | Hydroxypropylmethylcellulose |
| Demacol 30MST | Demacsa (Mexico) | Solubility controlled Hydroxypropylmethylcellulose |
| 5010N | Wacker (Germany) | VAE Redispersible Powder |
| 5012T | Wacker (Germany) | VAE Redispersible Powder-Thixotropic modification |
| 5044N | Wacker (Germany) | VAE Redispersible Powder-Flexible |
| DM117P | Elotex | VA-VeoVa Redispersible Powder |
| Celvol 540S | Celanese (US) | partially hydrolyzed polyvinylalcohol |
| Celvol 165SF | Celanese (US) | fully hydrolyzed polyvinylalcohol |
| Berset 2700 | Bercin. Inc. (US) | cyclic amide condensate aqueous blend with glyoxal |
| Polycup 172 | Hercules (US) | aqueous solution of a cationic amine polymer-epichlorohydrin adduct |
| Zirgel K | MEL Chemicals | Potassium Zirconium Carbonate |
| SMA 1000P | Sartomer (US) | Styrene-Maleic Anhydride 1:1 molar ratio |
| SMA 3000P | Sartomer (US) | Styrene-Maleic Anhydride 3:1 molar ratio |
| Hyperdrill 247RD | QMAX Solutions Inc (US) | polyacrylamide |
| Penford Gum 290 | Penford (US) | Hydroxyethyl ether derivatized corn starch |
| Lupamin 9095 | BASF | Polyvinylamine |
| Lupamin 9030 | BASF | Polyvinylamine-co-vinylformamide |
| Polyamine B | Akzo Nobel | Polyethyleneamine |
| Glyoxal | Sigma-Aldrich (US) | 40% aqueous solution of glyoxal |
| Omyacarb 8-CL | Omya | Calcium Carbonate |
| Omyacarb 10-BE | Omya | Calcium Carbonate |
| Caloxol PG | Omya | Calcium Oxide |

TABLE 6

Sample Compositions

| | Cement | | Sand | | Hydroscopic/Rheology Modifier | |
|---|---|---|---|---|---|---|
| Example | Type | Amount | Type | Amount | Type | Amount |
| 6-1a | Proprietary Spanish Mortar Producer Blend | | | | CE Demacol 30MST | 0.4 |
| 6-1b | Proprietary Spanish Mortar Producer Blend | | | | CE Demacol 30MST | 0.4 |
| 6-2 | Electroland 42.5R | 40 | Quarzwerke H33/H35 Blend | 60 | CE Tylose MOT 60000YP4 | 0.4 |
| 6-3 | Electroland 42.5R | 40 | Quarzwerke H33/H35 Blend | 60 | CE Tylose MHS 60000YP4 | 0.4 |
| 6-4 | Electroland 42.5R | 40 | Quarzwerke H33/H35 Blend | 60 | CE Tylose MOT 60000YP4 | 0.4 |
| 6-5 | Proprietary Spanish Mortar Producer Blend | | | | CE Demacol 30MST | 0.4 |
| 6-6 | Electroland 42.5R | 35 | Quarzwerke H33/H35 Blend | 65 | CE Tylose MHS 60000YP4 | 0.4 |
| 6-7 | Electroland 42.5R | 40 | Quarzwerke H33/H35 Blend | 60 | PAM Hyperdrill 247RD | 0.4 |
| 6-8 | Electroland 42.5R | 40 | Quarzwerke H33/H35 Blend | 60 | Starch Penford Gum 290 | 0.4 |
| 6-9 | Proprietary Spanish Mortar Producer Blend | | | | CE Demacol 30MST | 0.4 |
| 6-10 | Electroland 42.5R | 40 | Quarzwerke H33/H35 Blend | 60 | CE Tylose MOT 60000YP4 | 0.4 |
| 6-12 | Electroland 42.5R | 40 | Quarzwerke H33/H35 Blend | 60 | CE Tylose MH 60001P4 | 0.4 |
| 6-13 | Electroland 42.5R | 40 | Quarzwerke H33/H35 Blend | 60 | CE Tylose MO 60016P4 | 0.4 |
| 6-14 | Electroland 42.5R | 40 | Quarzwerke H33/H35 Blend | 60 | CE Tylose MO 60016P4 | 0.4 |
| 6-15 | Electroland 42.5R | 40 | Quarzwerke H33/H35 Blend | 60 | CE Tylose MO 60016P4 | 0.4 |
| 6-16 | Electroland 42.5R | 40 | Quarzwerke H33/H35 Blend | 60 | CE Tylose MO 60016P4 | 0.4 |
| 6-20 | Electroland 42.5R | 35 | Quarzwerke H33/H35 Blend | 65 | CE Demacol 30MN | 0.4 |
| 6-21 | Electroland 42.5R | 35 | Quarzwerke H33/H35 Blend | 65 | CE Demacol 30MST | 0.4 |
| 6-22 | Electroland 42.5R | 35 | Quarzwerke H33/H35 Blend | 65 | CE Demacol 30MST | 0.4 |
| 6-23a | Proprietary Spanish Mortar Producer Blend | | | | CE Demacol 30MST | 0.4 |
| 6-23b | Proprietary Spanish Mortar Producer Blend | | | | CE Demacol 30MST | 0.4 |

TABLE 6-continued

Sample Compositions

| | | | | | | |
|---|---|---|---|---|---|---|
| 6-23c | | Proprietary Spanish Mortar Producer Blend | | CE Demacol 30MST | | 0.4 |
| 6-24a | | Proprietary Spanish Mortar Producer Blend | | CE Culminal 1034 | | 0.4 |
| 6-24b | | Proprietary Spanish Mortar Producer Blend | | CE Culminal 1034R | | 0.4 |
| 6-24c | | Proprietary Spanish Mortar Producer Blend | | CE Culminal 1034R | | 0.4 |
| 6-25a | Electroland 42.5R | 35 | Quarzwerke H33/H35 Blend | 65 | CE Tylose MO 60016P4 | 0.4 |
| 6-25b | Electroland 42.5R | 35 | Quarzwerke H33/H35 Blend | 65 | CE Tylose MHS 60000YP4 | 0.4 |
| 6-26a | Electroland 42.5R | 35 | Quarzwerke H33/H35 Blend | 65 | CE Tylose MH 60001P4 | 0.4 |
| 6-26b | Electroland 42.5R | 50 | Quarzwerke H33/H35 Blend | 50 | CE Tylose MHS 60000YP4 | 0.4 |

| | Cement | | Calcium Oxide | | Sand | | Hydroscopic/Rheology Modifier | |
|---|---|---|---|---|---|---|---|---|
| Example | Type | Amount | Type | Amount | Type | Amount | Type | Amount |
| 6-18a | Electroland 52.5R | 25 | Caloxol | 7.5 | Quarzwerke H35 | 65 | CE Tylose MH 15002P6 | 0.25 |
| 6-18b | Electroland 52.5R | 25 | Caloxol | 7.5 | Quarzwerke H35 | 65 | CE Tylose MHS 60000YP4 | 0.25 |
| 6-18c | Electroland 52.5R | 25 | Caloxol | 7.5 | Quarzwerke H35 | 65 | CE Tylose MHS 60000YP4 | 0.25 |
| 6-18d | Electroland 52.5R | 25 | Caloxol | 7.5 | Quarzwerke H35 | 65 | CE Tylose MHS 60000YP4 | 0.25 |

| | Cement | | Calcium Oxide | | Calcium Carbonate | | Hydroscopic/Rheology Modifier | |
|---|---|---|---|---|---|---|---|---|
| Example | Type | Amount | Type | Amount | Type | Amount | Type | Amount |
| 6-19a | Electroland 52.5R | 19 | Caloxol | 2 | Omyacarb Blend** | 79 | CE Tylose MH 10007P6 | 0.3 |
| 6-19b | Electroland 52.5R | 19 | Caloxol | 2 | Omyacarb Blend** | 79 | CE Tylose MHS 60000YP4 | 0.3 |
| 6-19c | Electroland 52.5R | 19 | Caloxol | 2 | Omyacarb Blend** | 79 | CE Tylose MHS 60000YP4 | 0.3 |
| 6-19d | Electroland 52.5R | 19 | Caloxol | 2 | Omyacarb Blend** | 79 | CE Tylose MHS 60000YP4 | 0.3 |

| | Redispersible Powder | | Nitrogen Containing Polymer | | Polyvinyl Alcohol | | Reactive Agent | |
|---|---|---|---|---|---|---|---|---|
| Example | Type | Amount | Type | Amount | Type | Amount | Type | Amount |
| 6-1a | Wacker 5010N | 1 | Polyvinylalcohol-co-vinylamine | 0.4 | Celvol 540S | 0.2 | glyoxal | |
| 6-1b | Wacker 5010N | 1 | Polyvinylalcohol-co-vinylamine | 0.3 | Celvol 540S | 0.1 | glyoxal | |
| 6-2 | Wacker 5010N | 2 | Lupamin 9095 | 0.4 | Celvol 540S | 0.1 | glyoxal | |
| 6-3 | Wacker 5010N | 2 | Lupamin 9030 | 0.4 | Celvol 540S | 0.1 | glyoxal | |
| 6-4 | Wacker 5010N | 2 | Polyamine B | 0.4 | Celvol 540S | 0.1 | glyoxal | |
| 6-5 | Wacker 5010N | 1 | Polyvinylalcohol-co-vinylamine | 0.4 | Celvol 540S | 0.2 | glyoxal | |
| 6-6 | Wacker 5012T | 0.5 | Polyvinylalcohol-co-vinylamine | 0.4 | Celvol 540S | 0.2 | glyoxal | |
| 6-7 | Wacker 5010N | 2 | Polyvinylalcohol-co-vinylamine | 0.4 | Celvol 540S | 0.1 | glyoxal | 0.016 |
| 6-8 | Wacker 5010N | 2 | Polyvinylalcohol-co-vinylamine | 0.4 | Celvol 540S | 0.1 | glyoxal | 0.016 |
| 6-9 | Wacker 5010N | 1 | Polyvinylalcohol-co-vinylamine | 0.4 | Celvol 540S | 0.2 | glyoxal | |
| 6-10 | Wacker 5010N | 2 | Polyvinylalcohol-co-vinylamine | 0.4 | Celvol 165SF | 0.1 | glyoxal | |
| 6-12 | Wacker 5010N | 2 | Polyvinylalcohol-co-vinylamine | 0.4 | Celvol 540S | 0.1 | Berset 2700 | 0.018 |
| 6-13 | Wacker 5010N | 2 | Polyvinylalcohol-co-vinylamine | 0.4 | Celvol 540S | 0.1 | Polycup 172 | 0.016 |
| 6-14 | Wacker 5010N | 2 | Polyvinylalcohol-co-vinylamine | 0.4 | Celvol 540S | 0.1 | Zirgel K | 0.030 |
| 6-15 | Wacker 5010N | 2 | Polyvinylalcohol-co-vinylamine | 0.4 | Celvol 540S | 0.1 | SMA 1000P | 0.028 |
| 6-16 | Wacker 5010N | 2 | Polyvinylalcohol-co-vinylamine | 0.4 | Celvol 540S | 0.1 | SMA 3000P | 0.083 |
| 6-18a | Wacker 5010N | 2.0 | — | | — | | — | |
| 6-18b | Wacker 5010N | 0.5 | Polyvinylalcohol-co-vinylamine | 0.2 | C540S | 0.05 | glyoxal | |
| 6-18c | Wacker 5010N | 0.5 | Polyvinylalcohol-co-vinylamine | 0.25 | C540S | 0.07 | glyoxal | |
| 6-18d | Wacker 5044N | 0.5 | Polyvinylalcohol-co-vinylamine | 0.2 | C540S | 0.05 | glyoxal | |
| 6-19a | Wacker 5010N | 1.5 | — | | — | | — | |
| 6-19b | Wacker 5010N | 0.5 | Polyvinylalcohol-co-vinylamine | 0.2 | C540S | 0.05 | glyoxal | |
| 6-19c | Wacker 5010N | 0.5 | Polyvinylalcohol-co-vinylamine | 0.23 | C540S | 0.07 | glyoxal | |
| 6-19d | Wacker 5044N | 0.5 | Polyvinylalcohol-co-vinylamine | 0.15 | C540S | 0.05 | glyoxal | |
| 6-20 | Wacker 5010N | 4 | — | | — | | — | |
| 6-1 | CZ VA-VeoVa* | 4 | — | | — | | glyoxal | |
| 6-2 | CZ VA-VeoVa* | 2 | Polyvinylalcohol-co-vinylamine | 0.146 | Celvol 540S | 0.13 | glyoxal | |
| 6-23a | Wacker 5010N | 4 | — | | — | | — | |
| 6-23b | Wacker 5010N | 1 | Polyvinylalcohol-co-vinylamine | 0.4 | Celvol 540S | 0.2 | glyoxal | |
| 6-23c | Wacker 5010N | 1 | Polyvinylalcohol-co-vinylamine | 0.3 | Celvol 540S | 0.1 | glyoxal | |
| 6-24a | Eloxtex DM117P | 4 | — | | — | | — | |
| 6-24b | Eloxtex DM117P | 1 | Polyvinylalcohol-co-vinylamine | 0.4 | Celvol 540S | 0.2 | glyoxal | |
| 6-24c | Eloxtex DM117P | 1 | Polyvinylalcohol-co-vinylamine | 0.3 | Celvol 540S | 0.1 | glyoxal | |
| 6-25a | Wacker 5012T | 4 | — | | — | | — | |
| 6-25b | Wacker 5012T | 0.5 | Polyvinylalcohol-co-vinylamine | 0.4 | Celvol 540S | 0.2 | glyoxal | |
| 6-26a | Wacker 5044T | 4 | — | | — | | — | |
| 6-26b | Wacker 5044T | 0.5 | Polyvinylalcohol-co-vinylamine | 0.2 | Celvol 540S | 0.1 | glyoxal | |

CE Cellulose Ether
PAM Polyacrylamide
**Omyacarb blend is a 50:50 Blend of Omyacarb 8 and Omyacarb 10
*CZ VA-VeoVa is a RP stabilized with a blend of PVOH and polyvinylalcohol-co-vinylamine

TABLE 7

Comparison of Compositions with Different Nitrogen-Containing Polymers

| | | Cementitious Tile Adhesive Properties | | | | | | | |
|---|---|---|---|---|---|---|---|---|---|
| Example # | Description of Nitrogen Containing Polymer | % Water (%) | 28 Day Std. Aging (N/mm²) | Water Immersion (N/mm²) | Heat Aging (N/mm²) | Freeze-Thaw (N/mm²) | Open Time 20 min (N/mm²) | Open Time 30 min (N/mm²) | Slip (mm) | Flexibility (mm) |
| 6-1a | PVOH-VAm Copolymer | 24 | 2.2 | 1.2 | 1.5 | 1.2 | 1.2 | 0.9 | 6.6 | 1.7 |
| 6-1b | PVOH-VAm Copolymer | 24 | 1.0 | 0.8 | 1.1 | 1.5 | 1.2 | 0.6 | 0.1 | 1.5 |
| 6-2 | Polyvinylamine Polymer | 22 | 1.6 | 0.5 | 0.8 | 0.6 | 0.8 | 0.3 | 0.3 | 2.2 |
| 6-3 | Polyvinyl-formamide-vinylamine Copolymer | 21.5 | 2.0 | 1.0 | 1.6 | 1.3 | 1.0 | 0.5 | 0.3 | 2.3 |
| 6-4 | Polyethylene-imine | 23 | 1.7 | 0.8 | 1.6 | 0.8 | 1.3 | 0.8 | 1.2 | 2.0 |

Table 7 demonstrates the use of a variety of nitrogen containing polymers in cementitious compositions in a formulation designed for Tile Adhesives. Each of the nitrogen containing polymers tested showed positive results in adhesive properties as well as specialty properties like slip resistance, which demonstrates the versatility of this technology to work with several different types of nitrogen chemistry. Examples 1-4 also used 2 or less parts of redispersible powder, which is beneficial to cementitious mortar producers. All results in Table 7 were tested using the EN 12004 Norm.

containing group with glyoxal as the reactive agent. However, the examples vary in the type of rheological or hygroscopic polymeric modifiers. The technology of incorporating the nitrogen containing polymer with a reactive agent performs very well generally regardless of what other polymeric additives are used. Two types of cellulose derivatives are used with success: hydroxypropyl-methylcellulose and hydroxyethyl-methylcellulose. Also, two types of polyvinylalcohol are used with success: partially hydrolyzed and fully hydrolyzed. Fur-

TABLE 8

Comparison of Compositions with Different Modifiers

| | | Cementitious Tile Adhesive Properties | | | | | | | |
|---|---|---|---|---|---|---|---|---|---|
| Example # | Description of Different Rheological Modifiers and Hygroscopic Polymers | % Water (%) | 28 Day Std. Aging (N/mm²) | Water Immersion (N/mm²) | Heat Aging (N/mm²) | Freeze-Thaw (N/mm²) | Open Time 20 min (N/mm²) | Open Time 30 min (N/mm²) | Slip (mm) | Flexibility (mm) |
| 6-5 | Hydroxypropylmethyl cellulose | See Example #1 as a reference | | | | | | | | |
| 6-6 | Hydroxyethylmethyl cellulose | 23 | 1.7 | 0.8 | 1.2 | 1.3 | 1.3 | 0.8 | 0.2 | 2.5 |
| 6-7 | Polyacrylamide | 25 | 1.1 | 0.4 | 1.0 | 0.8 | 1.4 | 0.7 | 0.1 | 1.8 |
| 6-8 | Starch | 21 | 0.3 | 0.2 | 0.1 | 0.3 | 0.1 | 0 | 0.1 | 2.0 |
| 6-9 | Partially Hydrolyzed. High MW PVOH | See Example #1 as a reference | | | | | | | | |
| 6-10 | Fully Hydrolyzed. High MW PVOH | 24 | 1.7 | 0.7 | 1.4 | 1.6 | 1.5 | 1.1 | 3.2 | 3.3 |

Table 8 demonstrates the use of a variety of alternate polymeric ingredients in cementitious compositions in a formulation designed for Tile Adhesives. Each example in Table 8 uses the vinylalcohol-vinylamine copolymer as the nitrogen thermore, a nitrogen containing rheological modifier like polyacrylamide also showed good properties as a tile adhesive. Starch, on the other hand, clearly imparted poor performance to the formulation.

TABLE 9

Comparison of Compositions with Different Crosslinkers

| | | Cementitious Tile Adhesive Properties | | | | | | | | |
|---|---|---|---|---|---|---|---|---|---|---|
| Example # | Description of Reactive Agents | % Water (%) | 28 Day Std. Aging (N/mm²) | Water Immersion (N/mm²) | Heat Aging (N/mm²) | Freeze-Thaw (N/mm²) | Open Time 20 min (N/mm²) | Open Time 30 min (N/mm²) | Slip (mm) | Flexibility (mm) |
| 6-11 | Dialdehyde #1 - Pure Glyoxal | | Examples 1-10 show the use of standard glyoxal | | | | | | | |
| 6-12 | Dialdehyde #2 - Proprietary Glyoxal Blend | 22 | 1.7 | 0.6 | 1.1 | 0.8 | 0.6 | 0.3 | 0.3 | 2.2 |
| 6-13 | Polyamide-Epichlorohydrin | 23 | 2.2 | 1.1 | 1.9 | 1.4 | 1.1 | 0.6 | 0.5 | 2.1 |
| 6-14 | Zirconium Salt | 28 | 1.8 | 0.6 | 1.6 | 1.2 | 1.6 | 1.1 | 8.5 | 2.1 |
| 6-15 | 50:50 SMA Polymer | 25 | 1.7 | 0.7 | 1.9 | 0.9 | 1.1 | 0.8 | 1.2 | 1.9 |
| 6-16 | 75:25 SMA Polymer | 31 | 1.5 | 0.6 | 1.5 | 0.8 | 1.4 | 1.3 | 0.3 | 3.6 |

Table 9 demonstrates the use of a variety of reactive agents in cementitious compositions in a formulation designed for Tile Adhesive applications. Each example in Table 9 uses the vinylalcohol-vinylamine copolymer as the nitrogen containing group. Despite varying the type of reactive agent, each example in Table 9 demonstrates a quality tile adhesive with favorable properties. This further supports the technology claims that any reactive agent capable of crosslinking with the nitrogen containing polymer works in these cementitious systems.

TABLE 10A

Comparisons with Different End Uses (Exterior Insulation and Finishing Systems - EIFS)

| | | EIFS Properties - According to ETAG 004 | | | | | | |
|---|---|---|---|---|---|---|---|---|
| | Alternative Application - | Water | Water Absorption (6 mm Thickness) | | Freeze-thaw | Resistance to Perforation | Base Coat to Insulation Bond Strength (N/mm²) | |
| Example # | Exterior Insulation & Finishing Systems | Demand % | 1 hour - (kg/m²) | 24 hours - (kg/m²) | Behavior (pass/fail) | (Perfotest) (mm) - Category | Dry | Water - 2 hour dry | Water - 7 day dry |
| 6-18a | Control Sample | 22 | 0.14 - pass | 0.83 - pass | no failures - pass | 15 mm (pass) - Cat II | 0.16 | 0.15 | 0.17 |
| 6-18b | Celanese Sample #1 | 22 | 0.12 - pass | 0.76 - pass | no failures - pass | 15 mm (pass) - Cat II | 0.15 | 0.15 | 0.14 |
| 6-18c | Celanese Sample #2 | 22 | 0.07 - pass | 0.53 - pass | no failures - pass | 12 mm (pass) - Cat II | 0.16 | 0.17 | 0.17 |
| 6-18d | Celanese Sample #3 | 22 | 0.11 - pass | 0.62 - pass | no failures - pass | 15 mm (pass) - Cat II | 0.14 | 0.15 | 0.17 |

Table 10A provides examples of typical formulations used as adhesives for Exterior Insulation and Finishing Systems (EIFS). The testing protocol follows ETAG 004. All samples 18a-18d were mixed to the same consistency using 22% water addition by weight. For a sample to pass the water absorption test, it must have less than 1.0 kg/m² water absorption after 1 hour of immersion. All samples pass this test, and all samples with the novel nitrogen-containing polymer and reactive agent perform better than the Control Sample 6-18a with only redispersible powder. Furthermore, if a sample retains less than 0.5 kg/m² water after 24 hours of immersion, no Freeze-thaw testing is required. None of the samples reached the aforementioned benchmark, so all required Freeze-thaw testing; however, sample 6.18c was much improved over the control and came close to the 0.5 kg/m² specification, and all Celanese Samples outperformed the Control. The Freeze-thaw behavior is measured on a pass fail basis to be determined by the appearance of cracks and fissures. All samples passed the test. Next, all samples received a rating of Category II for the perforation test. Category II is the medium tier level for EIFS systems described by light traffic and potential for impact. Finally, the adhesion of the mortar to the insulation board was excellent for all samples. In each case, there was cohesive failure within the insulation board and not on the interface between the mortar and insulation. Based on these results, all the samples with the nitrogen-containing polymer and reactive agent performed at an identical level in each test to the Control, except for water absorption, where it was superior.

TABLE 10B

Comparisons of Compositions with Different End Uses (Joint Filler Compounds)

| | | | EN 13963 Properties - Jointing for Gypsum Plasterboards | | | | | | | |
|---|---|---|---|---|---|---|---|---|---|---|
| Example # | Alternative Application - Joint Filling Compound | % Water (%) | Fire Reaction EN13501 (rating) | Curing Time (min) | Crack Test (pass/fail) | 315 micron Coarse Particles % | 200 micron Coarse Particles % | Adhesion/ Cohesion (N/mm² and Class) | Break Load by Flexion Method First Fissure (N) | Break (N) |
| 6-19a | Control Sample | 35 | Not Tested | 40 - Short | pass | 0.08% - pass | 0.41% - pass | 0.37 - Type C | 139 | 151 |
| 6-19b | Celanese Comparison #1 | 40 | A1 | 50 - Short | pass | 0.11% - pass | 0.32% - pass | 0.34 - Type C | 133 | 140 |
| 6-19c | Celanese Comparison #2 | 35 | A1 | 35 - Short | pass | 0.06% - pass | 0.21% - pass | 0.37 - Type C | 127 | 132 |
| 6-19d | Celanese Comparison #3 | 35 | A1 | 60 - Short | pass | 0.09% - pass | 0.24% - pass | 0.33 - Type C | 148 | 157 |

Table 10B provides examples of typical formulations used as jointing compound for plasterboards. Formulations 19a-d could be used in Bedding, Finishing, Dual-Purpose, and/or Tapeless Jointing Compounds (Type 1A-4A and 1B-4B). Example 19a, the control sample, contained a typical amount of redispersible powder for this application, 1.5 PPHC. Each of the Celanese Comparison samples #1-3 which contain a reduced amount of redispersible powder and the novel nitrogen-containing reactive polymer system showed highly comparable, mostly identical, results compared to the control. Furthermore, since examples 19b-d contain less than 1% organic components by weight, they do not require a Fire Reaction test and receive an automatic rating of A1.

VeoVa, nitrogen polymer stabilized redispersible powder with a reactive agent in the same general formulation. Example 22 substitutes the VA-VeoVa redispersible powder at a lower addition rate as well as includes additional vinylalcohol-vinylamine copolymer with a reactive agent. Whereas both Example 21 and 22 have some deficiencies when compared to Example 20, they also showed some novel improvements as well. For example, even with the addition of more water in Examples 21 and 22, the slip values of those formulas were far improved over the control in Example 20. This property supports our theory of a crosslinked polymer system providing specific benefits in cementitious compositions.

One aspect of novelty in this technology is the ability to reduce the overall level of polymer in a cementitious formu-

TABLE 11

Comparison of Nitrogen Containing Polymer Stabilized Redispersible Powders

| | | | Cementitious Tile Adhesive Properties | | | | | | | |
|---|---|---|---|---|---|---|---|---|---|---|
| Example # | Description of Redispersible Powder | % Water (%) | 28 Day Std. Aging (N/mm²) | Water Immersion (N/mm²) | Heat Aging (N/mm²) | Freeze-Thaw (N/mm²) | Open Time 20 min (N/mm²) | Open Time 30 min (N/mm²) | Slip (mm) | Flexibility (mm) |
| 6-20 | Commercial VAE RP | 21 | 1.7 | 0.5 | 1.6 | 0.7 | 0.6 | 0.3 | 0.6 | 2.7 |
| 6-21 | VA-VeoVA with PVOH-Vam stabilizer | 23 | 1.3 | 0.4 | 0.4 | 1.0 | 0.2 | 0.1 | 0.1 | 2.0 |
| 6-22 | Blend of VA-VeoVA with PVOH-Vam stabilizer & additional PVOH-Vam | 22 | 1.1 | 0.4 | 0.4 | 0.9 | 0.2 | 0.1 | 0.1 | 1.8 |

Table 11 is a comparison of a commercially available vinylacetate ethylene (VAE) emulsion (Wacker 5010N) in Example 20, with novel Celanese redispersible powders stabilized with a vinylalcohol-vinylamine copolymer and a reactive agent, glyoxal, in Examples 21 and 22. Example 21 is a direct comparison to Example 20, where 4 parts of the VAE redispersible powder were replaced with 4 parts of a VAlation by reducing the level of redispersible powder and still maintaining or even improving product performance. This would represent both a cost savings for mortar formulators and provide them with the ability to make a more balanced formulation. The following Examples 12a-d, demonstrate that novelty.

TABLE 12a

Comparison #1 of Invention Compositions with Control Composition Having Higher Redispersible Powder Content

| Example # | Control Comparison #1 | Cementitious Tile Adhesive Properties | | | | | | | |
|---|---|---|---|---|---|---|---|---|---|
| | | % Water (%) | 28 Day Std. Aging (N/mm²) | Water Immersion (N/mm²) | Heat Aging (N/mm²) | Freeze-Thaw (N/mm²) | Open Time 20 min (N/mm²) | Open Time 30 min (N/mm²) | Slip (mm) | Flexibility (mm) |
| 6-23a | Control Formulation 23a | 24% | 2.3 | 1.0 | 2.2 | 2.1 | 1.8 | 1.5 | 50 | 2.3 |
| 6-23b | Celanese Comparison 23b | 24% | 2.2 | 1.2 | 1.5 | 1.2 | 1.5 | 0.7 | 3.0 | 1.7 |
| 6-23c | Celanese Comparison 23c | 24% | 1.0 | 0.8 | 1.1 | 1.5 | 1.2 | 0.6 | 0.1 | 1.5 |

Table 12a compares Control Formulation 23a that contains 4 parts of Wacker 5010N redispersible powder with Examples 23b and 23c that contain only 1 part of Wacker 5010N redispersible powder in typical Tile Adhesive based formulations. Example 23b replaces the 3 parts of redispersible powder with 0.4 parts of vinylalcohol-vinylamine copolymer and 0.2 parts of polyvinylalcohol, and Example 23c uses only 0.3 parts of vinylalcohol-vinylamine copolymer and 0.1 parts of polyvinylalcohol. Example 23b meets all of the same standards (as defined by EN 12004) as the Control 23a. Example 23b also demonstrates a strong improvement in slip properties at the same water addition rate. Example 23c, which has even less polymer than 23b, meets the majority of the same standards as 23a, only failing to reach 1.0 N/mm² in Water Immersion; however, Example 23c has extremely high slip resistance that would give it a superior rating to the control in that category.

Table 12b compares Control Formulation 24a that contains 4 parts of Elotex DM117P redispersible powder with Examples 24b and 24c that contain only 1 part of Elotex DM117P redispersible powder in typical Tile Adhesive based formulations. Example 24b replaces the 3 parts of redispersible powder with 0.4 parts of vinylalcohol-vinylamine copolymer and 0.2 parts of polyvinylalcohol, and Example 24c uses only 0.3 parts of vinylalcohol-vinylamine copolymer and 0.1 parts of polyvinylalcohol. Both Examples 24b and 24c meet the exact same standards (as defined by EN 12004) as the Control 24a sample. Also, both Celanese Comparison samples show a strong improvement in slip with the same level of water addition.

TABLE 12b

Comparison #2 of Invention Compositions with Control Composition Having Higher Redispersible Powder Content

| Example # | Control Comparison #2 | Cementitious Tile Adhesive Properties | | | | | | | |
|---|---|---|---|---|---|---|---|---|---|
| | | % Water (%) | 28 Day Std. Aging (N/mm²) | Water Immersion (N/mm²) | Heat Aging (N/mm²) | Freeze-Thaw (N/mm²) | Open Time 20 min (N/mm²) | Open Time 30 min (N/mm²) | Slip (mm) | Flexibility (mm) |
| 6-24a | Control Formulation 24a | 24% | 1.8 | 0.7 | 1.3 | 1.8 | 1.2 | 1.0 | 12.2 | 2.2 |
| 6-24b | Celanese Comparison 24b | 24% | 1.1 | 1.0 | 0.9 | 1.2 | 1.2 | 0.9 | 6.6 | 1.5 |
| 6-24c | Celanese Comparison 24c | 24% | 2.0 | 0.6 | 0.8 | 2.0 | 1.1 | 0.8 | 0.8 | 1.6 |

TABLE 12c

Comparison #3 of Invention Compositions with Control Composition Having Higher Redispersible Powder Content

| Example # | Control Comparison #3 | % Water (%) | 28 Day Std. Aging (N/mm$^2$) | Water Immersion (N/mm$^2$) | Heat Aging (N/mm$^2$) | Freeze-Thaw (N/mm$^2$) | Open Time 20 min (N/mm$^2$) | Open Time 30 min (N/mm$^2$) | Slip (mm) | Flexibility (mm) |
|---|---|---|---|---|---|---|---|---|---|---|
| 6-25a | Control Formulation 25a | 22% | 1.4 | 0.7 | 1.3 | 1.6 | 0.7 | 0.3 | 0.3 | 3.1 |
| 6-25b | Celanese Comparison 24b | 23% | 1.7 | 0.8 | 1.2 | 1.3 | 1.3 | 0.8 | 0.2 | 2.5 |

Table 12c compares Control Formulation 25a that contains 4 parts of Wacker 5012T redispersible powder with Example 25b that contains only 0.5 parts of Wacker 5012T redispersible powder in typical Tile Adhesive based formulations. Example 25b replaces the 3.5 parts of redispersible powder with 0.4 parts of vinylalcohol-vinylamine copolymer and 0.2 parts of polyvinylalcohol. Despite removing the majority of the redispersible powder, Sample 25b has the same rating (based on EN 12004) as the Control 25a. Furthermore, Sample 25b shows better 28 Day Aging, Water Immersion, Open Time, and Slip performance.

TABLE 12d

Comparison #3 of Invention Compositions with Control Composition Having Higher Redispersible Powder Content

| Example # | Control Comparison #4 | % Water (%) | 28 Day Std. Aging (N/mm$^2$) | Water Immersion (N/mm$^2$) | Heat Aging (N/mm$^2$) | Freeze-Thaw (N/mm$^2$) | Open Time 20 min (N/mm$^2$) | Open Time 30 min (N/mm$^2$) | Slip (mm) | Flexibility (mm) |
|---|---|---|---|---|---|---|---|---|---|---|
| 6-26a | Control Formulation 25a | 22% | 1.2 | 0.9 | 1.3 | 1.7 | 1.2 | 0.8 | 4.7 | 2.4 |
| 6-26b | Celanese Comparison 26b | 26% | 1.5 | 1.2 | 1.0 | 1.4 | 0.9 | 0.6 | 6.6 | 1.8 |

Table 12d compares Control Formulation 26a that contains 4 parts of Wacker 5044N redispersible powder with Example 26b that contains only 0.5 parts of Wacker 5044N redispersible powder in typical Tile Adhesive based formulations. Example 26b replaces the 3.5 parts of redispersible powder with only 0.2 parts of vinylalcohol-vinylamine copolymer and 0.1 parts of polyvinylalcohol. Despite removing the majority of the redispersible powder, Sample 26b has a better rating (based on EN 12004) than the Control 26a because Sample 26b provides a higher level of performance.

It is appreciated from the foregoing examples that cementitious compositions in accordance with the invention exhibit a superior balance of properties, including flexibility, open times and so forth even with low levels of polymer additive. For example, the invention compositions in the adhesive exhibit surprising slip and water resistance which is a highly desirable feature for these classes of compositions.

There is thus provided in accordance with the invention the improvement for cementitious compositions comprising a reactive polymeric composition including a nitrogen-containing polymer and a reactive agent capable of crosslinking with the nitrogen of the polymer in situ within the cementitious composition. In some cases, the nitrogen-containing polymer composition comprises an amine-functional polymer, while in others, the nitrogen-containing polymer comprises an amide-functional polymer.

A suitable polymer is a vinyl alcohol and vinyl amine copolymer which contains from 2 mole percent to 30 mole percent vinyl amine, such as from 2 mole percent to 12 mole percent vinyl amine. Another suitable polymer is a vinyl amine homopolymer. Still other suitable nitrogen-containing polymers are vinylformamide-vinylamine copolymers and ethyleneimine polymers. Typically, the nitrogen-containing polymer is present in the cementitious composition in an amount of from 0.01% to 5% based on the dry weight of the cementitious composition such as where the nitrogen-containing polymer is present in the cementitious composition in an amount of from 0.1% to 2% based on the dry weight of the cementitious composition.

The reactive agent may comprise polyaldehydes, dialdehydes such as glyoxal; dicarboxylic anhydrides, maleic anhydride copolymers such as styrene maleic anhydride copolymer; an epichlorohydrin resin; polyacids, such as polyacrylic acid or polymethacrylic acid; polyacid esters such as polymethacrylate and polymethylmethacrylate; polyvinyl alcohol esters such as polyvinyl alcohol-acetoacetic acid ester (Gohsifimer Z); or a zirconium salt. Suitable reactive agents thus include a glutaraldehyde; a succinic dialdehyde; a blocked glyoxal; a cationic amine epichlorohydrin polymer; an amide-epichlorohydrin polymer; a potassium zirconium carbonate; an ammonium zirconium carbonate; a ketone formaldehyde; a styrene maleic anhydride copolymer; or a cyclic amide condensate. The dry weight ratio of reactive agent:nitrogen-containing polymer in the reactive polymeric composition is generally from 0.01 to 0.3; typically from 0.025 to 0.1. So also, the molar equivalent ratio of the reactive moieties of the reactive agent to nitrogen in the nitrogen-containing polymer is generally from 1:1 to 1:500; typically the molar equivalent ratio of the reactive moieties of the reactive agent to nitrogen in the nitrogen-containing polymer is from 1:10 to 1:200; and preferably the molar equivalent ratio of the reactive moieties of the reactive agent to nitrogen in the nitrogen-containing polymer is from 1:25 to 1:75.

In one preferred aspect, the reactive agent is reversibly reacted with a carrier prior to being provided to the reactive polymeric composition. The carrier may be a cellulose derivative, polyvinyl alcohol, or an inorganic carrier selected from clays, calcium carbonate and calcium oxide. The dry weight ratio of reactive agent:carrier is generally from 0.001:1 to 0.5:1; typically dry weight ratio of reactive agent: carrier is from 0.01:1 to 0.1:1. Suitable cellulose derivatives are hydroxypropyl methyl cellulose and hydroxyethyl methyl cellulose. Still others which may be employed include methyl cellulose; hydroxyethyl cellulose; hydroxypropyl cellulose; carboxymethyl cellulose; ethyl hydroxyethyl cellulose; ethyl cellulose or mixtures thereof. In general, dry weight ratio of the nitrogen-containing polymer to the cellulose derivative is from 1:5 to 5:1; such as where the dry weight ratio of the nitrogen-containing polymer to the cellulose derivative is from 1:4 to 4:1; or where the dry weight ratio of the nitrogen-containing polymer to the cellulose derivative is from 1:2 to 2:1.

In many cases, the reactive polymeric composition comprises a vinyl alcohol polymer or copolymer thereof as well as a cellulose derivate where the dry weight ratio of the cellulose derivative to the vinyl alcohol polymer is from 5:1 to 1:5. Typically in such cases the dry weight ratio of the cellulose derivative to the vinyl alcohol polymer is from 1:4 to 4:1 or from 1:1 to 3:1.

Generally speaking, when polyvinyl alcohol or vinyl alcohol copolymers are used, the vinyl alcohol polymer is present in an amount of from 0.05% to 1% based on the dry weight of the cementitious composition and the reactive polymeric composition is present in the cementitious composition in an amount of from 0.1% to 15% based on the dry weight of the cementitious composition. Perhaps more preferably, the reactive polymeric composition is present in the cementitious composition in an amount of from 0.25% to 5% based on the dry weight of the cementitious composition. In some preferred cases, the reactive polymeric composition is present in the cementitious composition in an amount of from 0.5% to 2% based on the dry weight of the cementitious composition.

The cementitious compositions of this invention are especially useful in connection with tile adhesive compositions, exterior insulation finishing compositions, joint filler compositions, as well as all cement compositions which traditionally employ redispersible powders such as troweling compositions; thin bed mortar compositions; sealing slurry compositions; powder paint compositions; rendering plaster compositions; patch and repair mortar compositions; mineral plaster compositions; gypsum compositions; grout compositions; façade coating compositions; concrete repair compositions; coatings; or self-leveling compositions.

In various applications, the reactive polymeric composition is admixed dry with the other components of the cementitious composition which are likewise dry, while in other cases the reactive polymeric composition is admixed wet or dry with a wet cementitious composition if so desired. In still yet further applications of the inventive compositions, the reactive polymeric composition is admixed wet with the other components of the cementitious composition, where the other components are wet or dry.

In another aspect of the invention, there is provided a cementitious composition comprising an inorganic binder; an inorganic filler; a polymeric composition including a nitrogen-containing polymer and a reactive agent capable of crosslinking with the nitrogen of the polymer in situ within the cementitious composition; and a cellulose derivative or a vinyl alcohol polymer which is also reactive with the reactive agent. Generally, the inorganic binder comprises cement, gypsum, an aluminate or mixtures thereof, whereas the filler comprises calcium carbonate, quartz, or mixtures thereof.

The compositions may further include an additive, the additive comprising a lubricant, hydrophobic agent fibers, pigments or mixtures thereof. Generally, the binder is present in an amount from 20 parts to 50 parts per hundred dry weight cement (PPHC), the filler is present in an amount from 10 parts to 90 PPHC and the nitrogen-containing polymer is present in an amount from 0.01 to 2 PPHC. A cellulose derivative may be present in an amount of from 0.01 to 3 PPHC and the composition further comprises a polyvinyl alcohol polymer in an amount of from 0.01 to 2 PPHC. In some embodiments, the composition contains a redispersible polymer powder, the redispersible polymer powder being present in an amount from 0.1 to 15 PPHC. The redispersible polymer powder may be present in an amount from 0.2 to 8 PPHC or from 0.25 to 5 PPHC or in an amount greater than 0.2 and less than 2 PPHC. Other suitable amounts for redispersible powder present are from 0.1 to 8 PPHC; less than 4 PPHC; less than 3 PPHC; or less than 2 PPHC.

In still another aspect of the invention there is provided an additive composition for mixing into a cementitious blend including an inorganic binder and an inorganic filler, the additive composition including a reactive polymeric composition comprising a nitrogen-containing polymer and a reactive agent capable of crosslinking with the nitrogen of the polymer in situ within the cementitious blend; and wherein the reactive agent is also reactive with cellulose derivatives and vinyl alcohol polymers. The reactive agent suitably comprises a glutaraldehyde; a succinic dialdehyde; a blocked glyoxal; a cationic amine epichlorohydrin polymer; an amide-epichlorohydrin polymer; a potassium zirconium carbonate; an ammonium zirconium carbonate; a ketone formaldehyde; a styrene maleic anhydride copolymer; or a cyclic amide condensate.

In yet a further aspect of the invention, there is provided an additive composition for mixing into a cementitious blend including an inorganic binder and an inorganic filler, the additive composition including a redispersible emulsion polymer composition as well as a nitrogen-containing additive polymer and a reactive agent capable of reacting with the nitrogen of the additive polymer in situ within the cementitious blend; and wherein the reactive agent is also reactive with cellulose derivatives and vinyl alcohol polymers. The redispersible emulsion polymer composition generally includes an emulsion polymer formed from one or more unbranched alkylcarboxylic acid vinyl ester monomers, branched alkylcarboxylic acid vinyl ester monomers, alcohol methacrylic acid ester monomers, vinyl aromatic monomers, olefin monomers, diene monomers, or vinyl halide monomers. A typical emulsion polymer comprises a copolymer of vinyl acetate and ethylene. Another suitable emulsion polymer comprises a copolymer of vinyl acetate and a vinyl ester of a versatic acid. Generally, the nitrogen-containing additive polymer is present in the additive composition in an amount from 4% to 20% by dry weight and the redispersible powder is present in an amount of from 1% to 15% based on the dry weight of the cementitious blend and the additive composition mixed therewith. The redispersible powder may be present in an amount of less than 8% based on the dry weight of the cementitious blend and the additive composition mixed therewith or the redispersible powder is present in an amount of less than 5% based on the dry weight of the cementitious blend and the additive composition mixed therewith. In some preferred cases, the redispersible powder is present in an amount of less than 2% based on the dry weight of the cementitious blend and the additive composition mixed therewith.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the various embodiments may be interchanged either in whole or in part. Furthermore, those of ordinary skill in the art will appreciate that the foregoing description is by way of example only, and is not intended to limit the invention as further described in the appended claims.

What is claimed:

1. An additive composition for mixing into a cementitious blend including an inorganic binder and an inorganic filler, the additive composition comprising: a nitrogen-containing polymer comprising monomers selected from the group consisting of vinyl amines, vinyl formamides, ethyleneamines, ethyleneimines, aminoethyl methacrylates, and caprolactams; a carrier component; and a reactive agent capable of crosslinking with the nitrogen of the polymer in situ within the cementitious blend; wherein the reactive agent is selected from the group consisting of: polyaldehydes selected from glyoxal, blocked glyoxal, glutaraldehyde, ketone formaldehyde and succinic dialdehyde; a dicarboxylic anhydride or polymer thereof; an epichlorohydrin resin; a zirconium salt; a cyclic amide condensate; and a polycarboxylic acid; and wherein the reactive agent is reversibly reacted with the carrier component prior to being provided to the additive composition.

2. The additive composition according to claim 1, wherein the nitrogen-containing polymer composition comprises an amine-functional polymer.

3. The additive composition according to claim 1, wherein the nitrogen-containing polymer composition comprises an amide-functional polymer.

4. The additive composition according to claim 1, wherein the nitrogen-containing polymer is a vinyl alcohol and vinyl amine copolymer.

5. The additive composition according to claim 1, wherein the nitrogen-containing polymer contains from 2 mole percent to 30 mole percent vinyl amine.

6. The additive composition according to claim 1, wherein the nitrogen-containing polymer contains from 2 mole percent to 12 mole percent vinyl amine.

7. The additive composition according to claim 1, wherein the nitrogen-containing polymer is a vinyl amine homopolymer.

8. The additive composition according to claim 1, wherein the nitrogen-containing polymer is a vinylformamide-vinylamine copolymer.

9. The additive composition according to claim 1, wherein the nitrogen-containing polymer is an ethyleneimine polymer.

10. The additive composition according to claim 1, wherein the reactive agent comprises a polyaldehyde.

11. The additive composition according to claim 1, wherein the reactive agent comprises glyoxal.

12. The additive composition according to claim 1, wherein the reactive agent comprises a dicarboxylic anhydride.

13. The additive composition according to claim 1, wherein the reactive agent comprises a maleic anhydride copolymer.

14. The additive composition according to claim 1, wherein the reactive agent comprises a styrene maleic anhydride copolymer.

15. The additive composition according to claim 1, wherein the reactive agent comprises a zirconium salt.

16. The additive composition according to claim 1, wherein the dry weight ratio of reactive agent:nitrogen-containing polymer in the reactive polymeric composition is from 0.01 to 0.3.

17. The additive composition according to claim 1, wherein the dry weight ratio of reactive agent:nitrogen-containing polymer in the reactive polymeric composition is from 0.025 to 0.1.

18. The additive composition according to claim 1, wherein the molar equivalent ratio of the reactive moieties of the reactive agent to nitrogen in the nitrogen-containing polymer is from 1:1 to 1:500.

19. The additive composition according to claim 1, wherein the molar equivalent ratio of the reactive moieties of the reactive agent to nitrogen in the nitrogen-containing polymer is from 1:10 to 1:200.

20. The additive composition according to claim 1, wherein the molar equivalent ratio of the reactive moieties of the reactive agent to nitrogen in the nitrogen-containing polymer is from 1:25 to 1:75.

21. The additive composition according to claim 1, wherein the carrier component is a cellulose derivative, polyvinyl alcohol, or an inorganic carrier selected from clays, calcium carbonate and calcium oxide.

22. The additive composition according to claim 1, wherein the carrier component is a cellulose derivative.

23. The additive composition according to claim 1, wherein the dry weight ratio of reactive agent:carrier component is from 0.001:1 to 0.5:1.

24. The additive composition according to claim 1, wherein the dry weight ratio of reactive agent:carrier component is from 0.01:1 to 0.1:1.

25. An additive composition for mixing into a cementitious blend including an inorganic binder and an inorganic filler, the additive composition including: a redispersible polymer comprising vinyl acetate and a comonomer in a weight ratio of from about 60:40 to about 90:10; a nitrogen-containing additive polymer comprising monomers selected from the group consisting of vinyl amines, vinyl formamides, ethyleneamines, ethyleneimines, aminoethyl methacrylates, and caprolactams; and a reactive agent capable of reacting with the nitrogen of the additive polymer in situ with the cementitious blend; wherein the reactive agent is also reactive with cellulose derivatives and vinyl alcohol polymers; and
wherein further the reactive agent is selected from the group consisting of: polyaldehydes selected from glyoxal, blocked glyoxal, glutaraldehyde, ketone formaldehyde and succinic dialdehyde; a dicarboxylic anhydride or polymer thereof; an epichlorohydrin resin; a zirconium salt; a cyclic amide condensate; and a polycarboxylic acid.

26. The additive composition according to claim 25, wherein the nitrogen-containing additive polymer is present in the additive composition in an amount from 4% to 20% by dry weight.

27. An additive composition for mixing into a cementitious blend including an inorganic binder and an inorganic filler, the additive composition comprising: an emulsion polymer stabilized with a nitrogen-containing stabilizing polymer comprising monomers selected from the group consisting of vinyl amines, vinyl formamides, ethyleneamines, ethyleneimines, aminoethyl methacrylates, and caprolactams; and a reactive agent capable of crosslinking with the nitrogen of the stabilizing polymer in situ within the cementitious blend; wherein the reactive agent is also reactive with cellulose derivatives and vinyl alcohol polymers; and wherein further the reactive agent is selected from the group consisting of: polyaldehydes selected from glyoxal, blocked glyoxal, glutaraldehyde, ketone formaldehyde and succinic dialdehyde; a dicarboxylic anhydride or polymer thereof; an epichlorohydrin resin; a zirconium salt; a cyclic amide condensate; and a polycarboxylic acid.

28. The additive composition according to claim 27, wherein the emulsion polymer is formed from one or more unbranched alkylcarboxylic acid vinyl ester monomers, branched alkylcarboxylic acid vinyl ester monomers, alcohol methacrylic acid ester monomers, vinyl aromatic monomers, olefin monomers, diene monomers, or vinyl halide monomers.

29. The additive composition according to claim 28, wherein the emulsion polymer comprises a copolymer of vinyl acetate and an olefin.

30. The additive composition according to claim 29, wherein the olefin comprises ethylene.

31. The additive composition according to claim 27, wherein the emulsion polymer comprises a copolymer of vinyl acetate and a vinyl ester of a carboxylic acid.

32. The additive composition according to claim 31, wherein the carboxylic acid comprises versatic acid.

33. The additive composition according to claim 27, wherein the additive composition is present in an amount of from 1% to 15% based on the dry weight of the cementitious blend and an additive composition mixed therewith.

34. The additive composition according to claim 33, wherein the additive composition is present in an amount of from 1% to less than 8% based on the dry weight of the cementitious blend and the additive composition mixed therewith.

35. The additive composition according to claim 33, wherein the additive composition is present in an amount of from 1% to less than 5% based on the dry weight of the cementitious blend and the additive composition mixed therewith.

36. The additive composition according to claim 33, wherein the additive composition is present in an amount of from 1% to less than 2% based on the dry weight of the cementitious blend and the additive composition mixed therewith.

37. The additive composition according to claim 27, wherein the nitrogen-containing polymer composition comprises an amine-functional polymer.

38. The additive composition according to claim 27, wherein the nitrogen-containing stabilizing polymer comprises an amide-functional polymer.

39. The additive composition according to claim 27, wherein the nitrogen-containing stabilizing polymer is a vinyl alcohol and vinyl amine copolymer.

40. The additive composition according to claim 27, wherein the nitrogen-containing stabilizing polymer contains from 2 mole percent to 30 mole percent vinyl amine.

41. The additive composition according to claim 27, wherein the nitrogen-containing stabilizing polymer contains from 2 mole percent to 12 mole percent vinyl amine.

42. The additive composition according to claim 27, wherein the nitrogen-containing stabilizing polymer is a vinyl amine homopolymer.

43. The additive composition according to claim 27, wherein the nitrogen-containing stabilizing polymer is a vinylformamide-vinylamine copolymer.

44. The additive composition according to claim 27, wherein the nitrogen-containing stabilizing polymer is an ethyleneimine polymer.

45. The additive composition according to claim 27, wherein the molar equivalent ratio of the reactive moieties of the reactive agent to nitrogen in the nitrogen-containing polymer is from 1:1 to 1:500.

46. The additive composition according to claim 27, wherein the molar equivalent ratio of the reactive moieties of the reactive agent to nitrogen in the nitrogen-containing polymer is from 1:10 to 1:200.

47. The additive composition according to claim 27, wherein the molar equivalent ratio of the reactive moieties of the reactive agent to nitrogen in the nitrogen-containing polymer is from 1:25 to 1:75.

48. An additive composition for mixing into a cementitious blend including an inorganic binder and an inorganic filler, the additive composition comprising a vinyl alcohol-vinyl amine copolymer and a reactive agent selected from the group consisting of a glyoxal, borax, an epichlorohydrin resin, a zirconium salt, and a styrene-maleic anhydride copolymer, wherein the reactive agent is reversibly reacted with a cellulose ether prior to being provided to the additive composition, and wherein further the reactive agent is capable of crosslinking with the nitrogen of the copolymer in situ within the cementitious blend.

49. An additive composition for mixing into a cementitious blend including an inorganic binder and an inorganic filler, the additive composition comprising: a reactive agent selected from the group consisting of glyoxal, a styrene maleic anhydride copolymer, an epichlorohydrin resin and borax; and a nitrogen-containing polymer selected from the group consisting of a vinyl amine homopolymer, a vinyl alcohol-vinyl amine copolymer, a vinyl formamide-vinyl amine copolymer, and an ethyleneimine homopolymer, wherein the reactive agent is capable of crosslinking with the nitrogen of the polymer in situ within the cementitious blend, and wherein further the nitrogen-containing polymer is incorporated into a redispersible vinyl acetate copolymer powder prior to addition to the composition.

50. The additive composition according to claim 1, wherein the weight ratio of the nitrogen-containing polymer to the carrier component is from about 1:5 to about 5:1.

* * * * *